United States Patent
Baruch

(10) Patent No.: US 10,509,954 B2
(45) Date of Patent: Dec. 17, 2019

(54) METHOD AND SYSTEM OF IMAGE SEGMENTATION REFINEMENT FOR IMAGE PROCESSING

(71) Applicant: INTEL CORPORATION, Santa Clara, CA (US)

(72) Inventor: Gilad Baruch, Jerusalemi (IL)

(73) Assignee: Intel Corporation, Santa Clara, CA (US)

( * ) Notice: Subject to any disclaimer, the term of this patent is extended or adjusted under 35 U.S.C. 154(b) by 798 days.

(21) Appl. No.: 15/041,024

(22) Filed: Feb. 10, 2016

(65) Prior Publication Data

US 2017/0228867 A1 Aug. 10, 2017

(51) Int. Cl.
| | |
|---|---|
| G06T 7/00 | (2017.01) |
| G06K 9/00 | (2006.01) |
| G06K 9/62 | (2006.01) |
| G06T 7/12 | (2017.01) |
| G06T 7/149 | (2017.01) |
| G06T 7/194 | (2017.01) |

(52) U.S. Cl.
CPC ....... *G06K 9/00362* (2013.01); *G06K 9/6207* (2013.01); *G06T 7/12* (2017.01); *G06T 7/149* (2017.01); *G06T 7/194* (2017.01); *G06T 2207/20116* (2013.01)

(58) Field of Classification Search
CPC .. G06K 9/00362; G06K 9/6207; G06T 7/194; G06T 7/12; G06T 7/149; G06T 2207/20116
See application file for complete search history.

(56) References Cited

U.S. PATENT DOCUMENTS

| | | | | |
|---|---|---|---|---|
| 8,971,584 | B2 * | 3/2015 | Wang | G06T 7/20 382/107 |
| 2008/0118136 | A1 * | 5/2008 | Cai | G06K 9/38 382/131 |
| 2017/0303790 | A1 * | 10/2017 | Bala | H04N 5/23293 |

OTHER PUBLICATIONS

Wikipedia, "Active contour model", retrieved online via https://en.Wikipedia.org/wiki/Active_contour_model, on Dec. 22, 2015.
Wikipedia, "Level set", retrieved online via https://en.wikipedia.org/wiki/Level_set on Dec. 22, 2015.
Wkipedia, "Parallel curve", retrieved online via https://en.wikipedia.org/wiki/Parallel_curve on Dec. 22, 2015.
"Structural Analysis and Shape Descriptors", retrieved online at http://docs.opencv.org/2.4/modules/imgproc/doc/structural_analysis_ and _shape_descriptors.html#findcontours, Feb. 10, 2016, pp. 1-19.
Baruch, Gilad et al., "Histogram-Based Image Segmentation", U.S. Appl. No. 14/866,686, filed Sep. 25, 2015.
Hickson, Steven et al., "Efficient Hierarchical Graph-Based Segmentation of RGBD Videos", in proceedings of 26th IEEE Conference on Computer Vision and Pattern Recognition (CVPR), Columbus, OH, USA, Jun. 2014.
Mille, Julien , "Narrow band region-based active contours and surfaces for 2D and 3D segmentation", Computer Vision and Image Understanding, vol. 113, Issue 9, 2009.

(Continued)

*Primary Examiner* — Yon J Couso
(74) *Attorney, Agent, or Firm* — Green, Howard & Mughal LLP.

(57) ABSTRACT

A system, article, and method of image segmentation refinement for image processing.

25 Claims, 9 Drawing Sheets

(56) References Cited

OTHER PUBLICATIONS

Sallem, Nizar K. et al., "Extended GrabCut for 3D and RGB-D Point Clouds", J. Blanc-Talon et al. (Eds.): ACIVS 2013, LNCS 8192, pp. 354-365, 2013, Springer International Publishing Switzerland 2013.
Sukuki, Satoshi et al., "Topological Structural Analysis of Digitized Binary Images by Border Following", Computer Vision, Graphics, and Image Processing, vol. 30, pp. 32-46, 1985.
Wikipedia, "Mixture Model", Wikipedia, the free encyclopedia, retrieved online at https://en.Wikipedia.org/wiki/Mixture_model#Gaussian_mixture_model, Feb. 10, 2016.
Yu, Ting et al., "Monocular Video Foreground/Background Segmentation by Tracking Spatial-Color Gaussian Mixture Models", Proceedings of the IEEE Workshop on Motion and Video Computing, IEEE Computer Society Washington DC, USA 2007.
Wikipedia, "Mathematical morphology", retrieved online via https://en.Wikipedia.org/wiki/Mathematical_morphology on Jul. 1, 2019.
Xu, Chenyang et al., "Active Contours, Deformable Models, and Gradient Vector Flow", Image Analysis and Communications Lab, ECE, Johns Hopkins University, retrieved online via http://iacl.ece.jhu.edu/Projects/gvf/ on Jul. 1, 2019.

\* cited by examiner

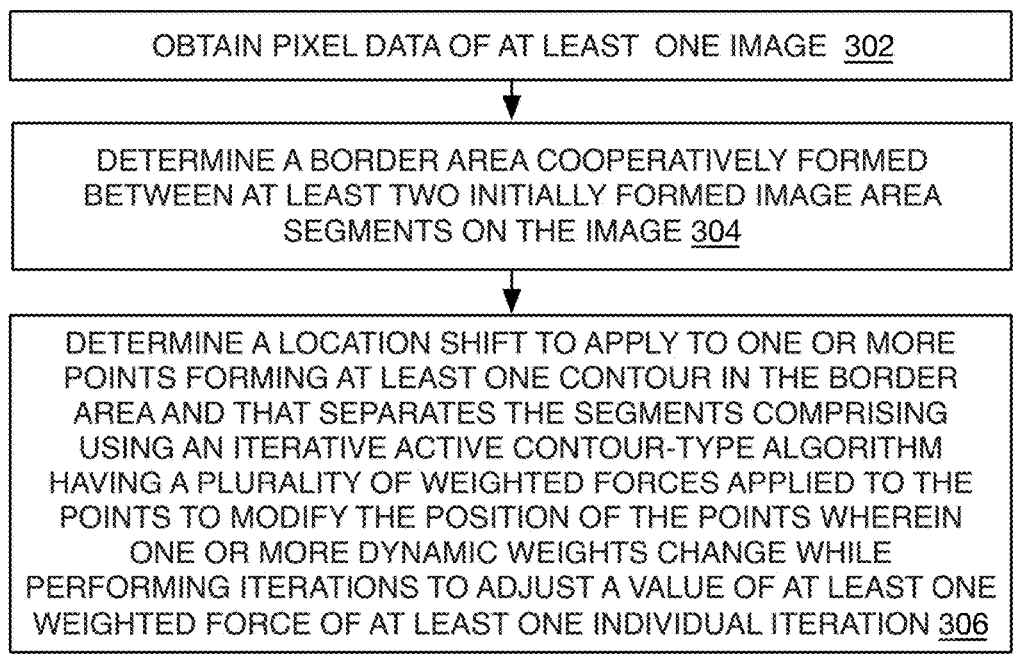
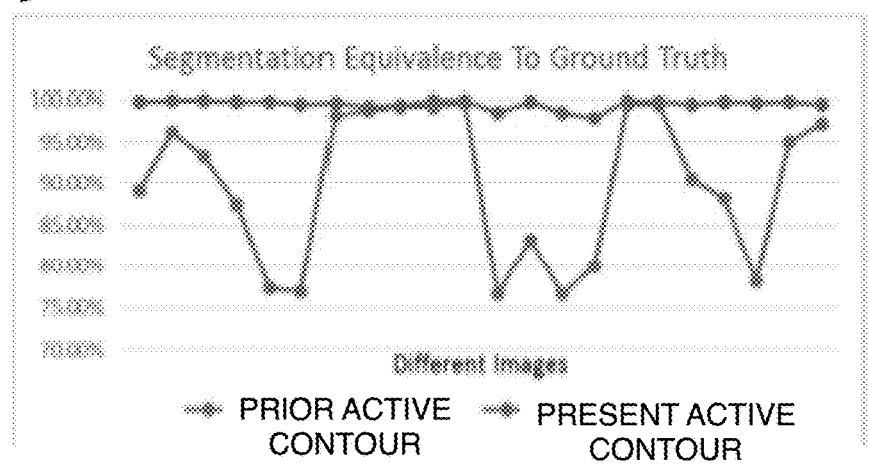

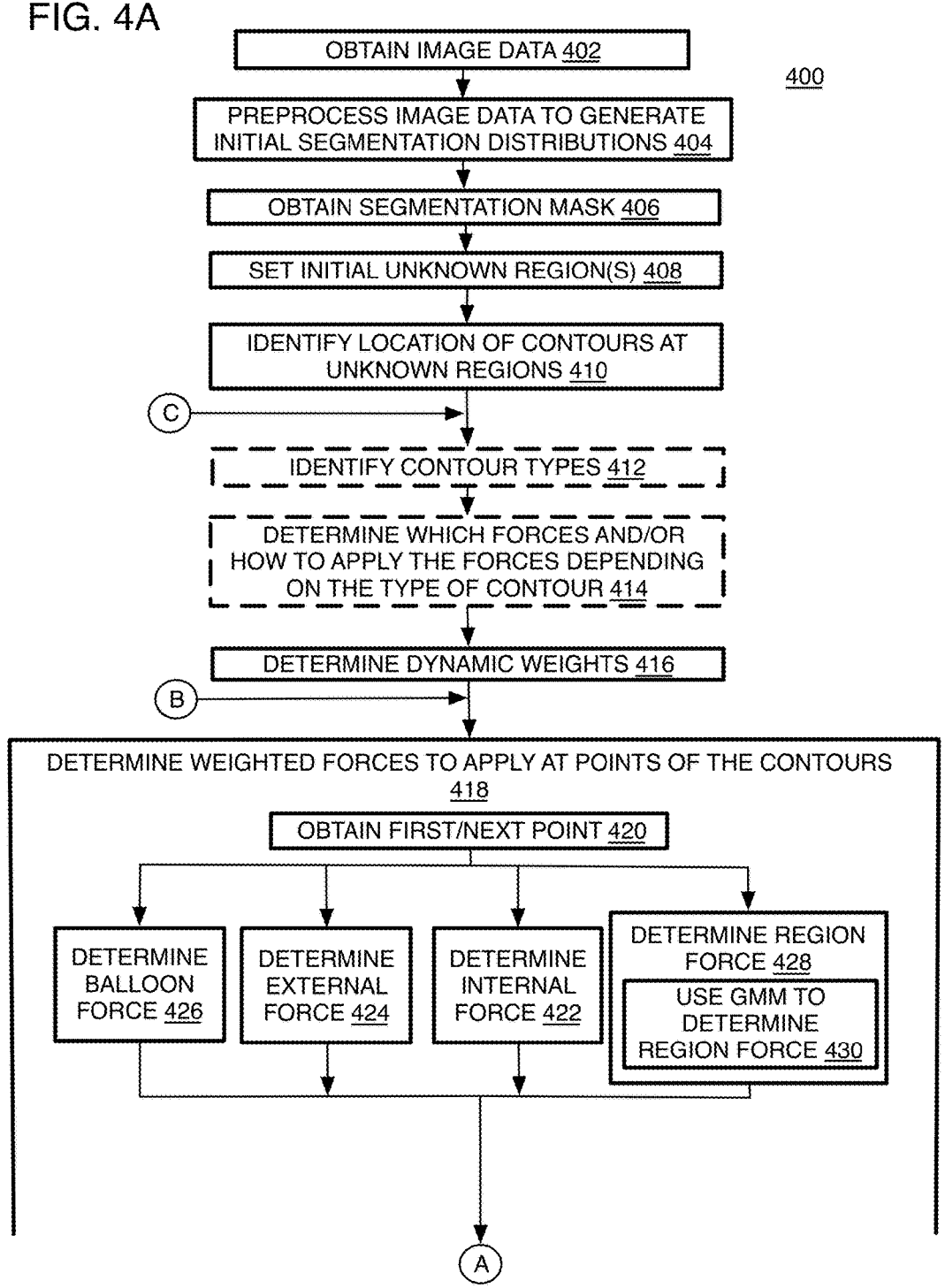

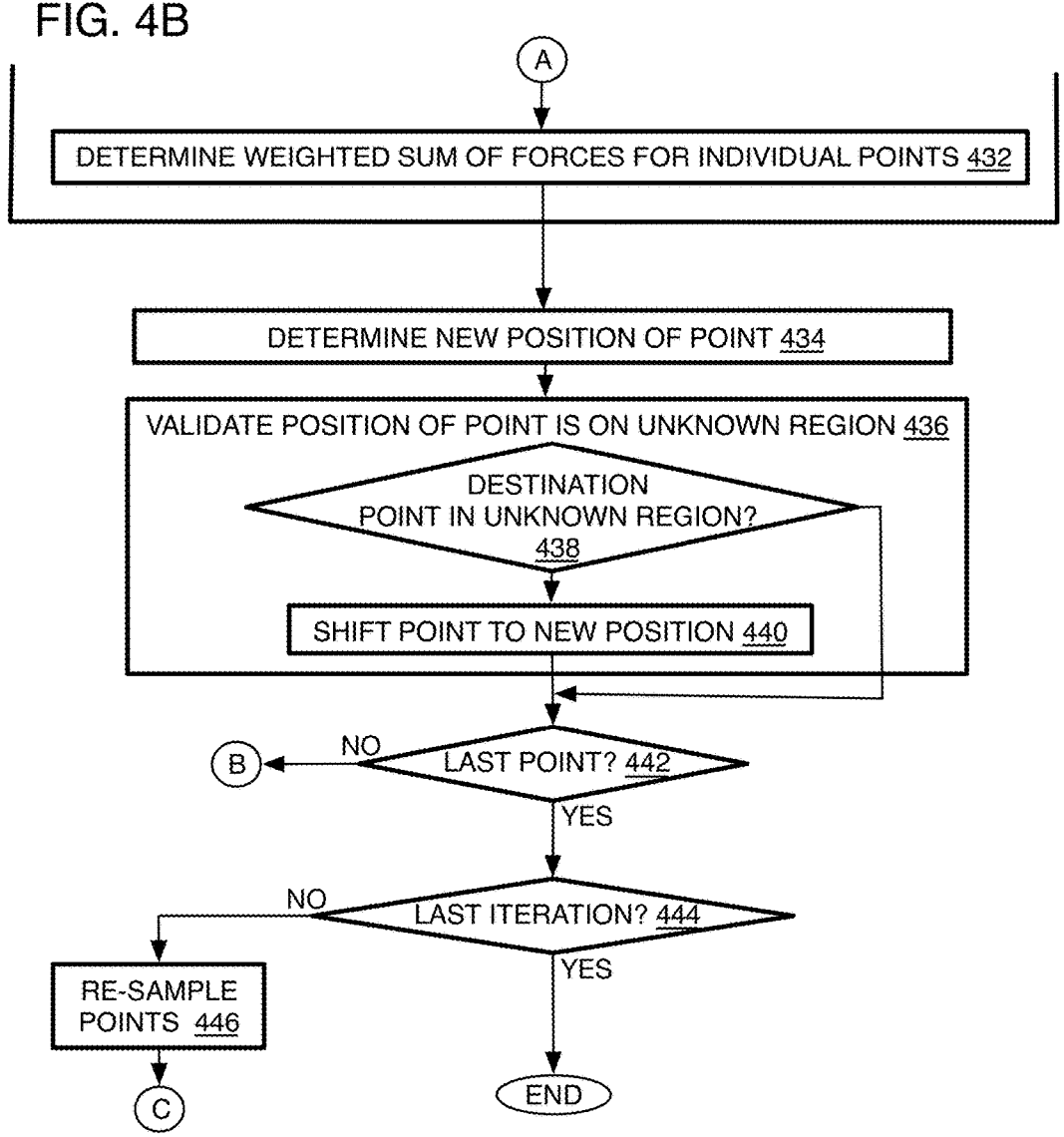

METHOD AND SYSTEM OF IMAGE SEGMENTATION REFINEMENT FOR IMAGE PROCESSING

BACKGROUND

When an image or scene is captured on a camera or provided on some other electronic device or computer as a digital image, it can be desirable to modify the image in ways that require the device to first segment the foreground of the image from the background. For example, a user may want to change the background in the image for entertainment reasons, practical reasons such as to replace the background of a person speaking in a video conference to provide a background more appropriate or less distracting for business purposes, or artistic reasons. The background-foreground segmentation also may be used for computer vision, object recognition and augmentation, medical imaging, video coding efficiency, and others.

A number of segmentation techniques divide an image into rough segments, such as background and foreground, and then use an algorithm specifically aimed at refining the border region between the segments. These border-refining algorithms, however, are often inaccurate by placing portions that should be part of a background into a foreground instead, and vice-versa. This especially occurs when the background and foreground have the same colors or when a color pattern has strong color differences and/or complex patterns that are mistakenly and undesirably split into different segments.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a flow chart showing a method of image segmentation refinement for image processing in accordance with the implementations herein;

FIGS. 4A-4B is a detailed flow chart of a method of image segmentation refinement for image processing in accordance with the implementations herein;

FIG. 5 is a graph comparing the segmentation equivalence to ground truth for previous and current active contour techniques;

DETAILED DESCRIPTION

Figure 1:
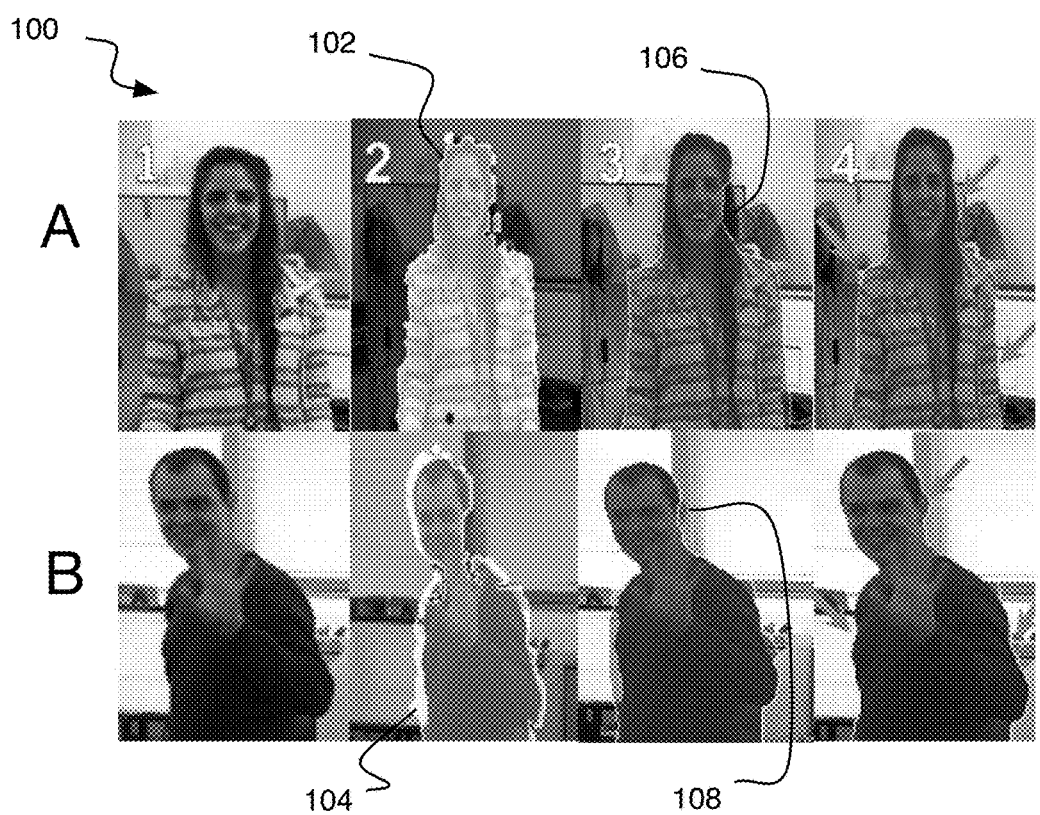
FIG. 1 is an illustration of images in different stages of segmentation into background and foreground to compare the implementations explained herein to conventional methods.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide image segmentation refinement for imaging processing.

As mentioned above, it can be desirable to segment an image into different segments, and particularly segment the foreground or detected objects of an image from the background whether for entertainment, practical reasons such as to replace the background of a person speaking in a video conference to provide a background more appropriate or less distracting for business purposes, or for artistic reasons such as for augmentation or cutting the foreground for pasting elsewhere. The segmentation also may be used for computer vision, object recognition, medical imaging, video coding efficiency, image editing, tracking, and others.

Also as mentioned, many different algorithms exist to perform image segmentation, most of which rely on color data of the pixels in the image. These methods typically operate on the assumption that pixels near each other with the same or similar color are part of the same object in the image, and this is usually determined by analyzing the color distributions or gradients in certain patterns of the pixels. These methods, however, can be inaccurate when areas of the image that should be placed in different segments are erroneously placed in the same segment because the areas have the same color, or when an alternating color pattern or patterns with more than two colors should be placed in a single segment but is split into different segments. Otherwise, other luminance (grayscale) or depth-based segmentation also may be used, some of which is summarized below when it is relevant to the present methods.

One segmentation strategy to overcome some of these issues is to determine an initial, rough segmentation, and set a narrow band at the border between the segmentations. A separate more precise algorithm is then used to determine the segmentation of the pixels within the band to provide a final refined segmentation. The initial input in a narrow band is not far from the desired output and so can be treated differently. One such algorithm is a parameterized active contour algorithm (or snake model) which may be used in computer vision processes such as object tracking, shape recognition and segmentation, and which may be the building blocks of many applications such as medical imaging, artistic photography, and so forth. See for example, https://en.wikipedia.org/wiki/Active_contour_model, which is incorporated herein for its contents on the filing date of this application.

The active contour technique forms a deformable contour (referred to as the snake) along the border (or here at the band), which segments the band using boundary discontinuities by minimizing an energy function associated with the contour. This algorithm incorporates color-based and shape-based forces with a resultant contour that aligns with the visual contour in the image. The energy function is an iteratively minimizing equation where internal energy controls or limits the deformations to the shape of the contour to maintain a smooth contour. Meanwhile, external energy controls fitting of the snake onto the image (or in this case, the border) and pulls the contours toward features such as lines, edges, and/or terminations on the image. Active contour is used due to its performance as well as accuracy and robustness. Such an active contour still has been found to be inaccurate resulting in parts of the image that should be part of a background but assigned to a foreground and vice-versa.

Referring to FIG. 1, two example images 1A and 1B are provided in original form in column 1. The input initial segmentation masks for the images 1A and 1B are shown in column 2, as images 2A and 2B respectively, and forming a narrow band 102 and 104 respectively between background and foreground segments. Column 3 shows the results after applying conventional active contour algorithms to the narrow bands and where a part 106 showing at least hair of a person of the image A is placed with the wrong segment, while at least an ear 108 of a person on image B is placed in the wrong segment. Other areas along the narrow band on the images are on the wrong segment as well. Column 4 shows the corrected images obtained by using the present active contour-type algorithms described below where the corrected areas are shown by the arrows.

One conventional application of active contour used to increase the accuracy of the segmentation includes the use of Level Set algorithms (see for example, https://en.wikipedia.org/wiki/Level_set), which is a sub-version of active contour, and may provide more precise segmentation. Basically, level set techniques treat the border as a level set or interface, and a signed distance function can be used to determine the distances from points in the narrow band to the interface. Partial derivative equations can be used to determine the change in position of the points from iteration to iteration in active contour computations. Run-time of these level set algorithms, however, is not practical for use with video processing in low power machines due to the heavy computational loads involved to compute distances of each point in the narrow band. Particularly, these conventional techniques solve the problems in three dimensions, which makes it much more computationally-intensive.

Also, the simple parameterized active contour algorithm does not handle complex shapes well, such as where holes (areas missing the correct data) may exist within a shape on an image, or other border areas divide a part (or object) of an image from the segment on which it belongs and attaches the part to the wrong segment. Each of these border areas (also called unknown regions) may have one or more contours where a single continuous contour can be very large, such as a main contour dividing a background from a foreground, or can be very small covering just a small number of pixels. Each contour at an unknown region is provided to the active contour algorithm. The conventional approach is to implement the active contour as a computational block, and use the same block for analysis of each contour no matter which type of border area the contour resides (whether desired or undesired, hole or not, and so forth). The implementer may perform some tuning to the active contour algorithm to find the best parameters that fits his\her need for all the required cases. The weights, however, will be fixed for the block for all iterations of the active contour algorithm. The results for segmentation of real world, complex images are typically poor segmentation.

To increase segmentation quality while providing a segmentation method that can be used on low power and/or small devices, an active contour method for unknown regions (also referred to herein as unknown, narrow, or border bands; unknown, narrow, or border areas, or border or narrow regions) is described herein that limits the computational load to perform higher quality narrow band segmentation. Specifically, one feature of the disclosed segmentation method and system is the ability to identify different types of contours and analyze the contours differently depending on the type of contour. For example, objects detected on a face still may have contours that need different treatments, such as different types of weights (and in turn forces) to be applied to the contours, or may need certain weights or forces to be applied differently. The type or differentiating characteristic of the contour depends on the type or characteristic of the unknown region on which it resides. Depending on the characteristic, the selection of forces (or weights) to apply and/or the way to apply a particular force may be different from contour to contour. The details of this feature are provided below.

By one example form, the unknown region segmentation by the active contour system disclosed herein uses at least two, but for the examples provided herein, at least four balancing forces or energies to shape the contours between segments. This may include a smoothness (or internal) force to limit the curvature of the contour at the unknown region, a gradient (or external or image force) that bends the contour within the unknown region toward edges or other structure in the content of the image, and a region force that indicates whether a pixel or point on the contour should be at an unknown region or within one of the bordering segments depending on the color or luminance data of neighboring pixels within a defined pixel region. A balloon force is added that may extend or retract the contour shape or holes in a segment. Both the region force and balloon force may be applied differently depending on the type of contour. These four forces are used in the examples herein but other forces may be used as well and are mentioned below.

By another form, while the conventional region force algorithm differentiates the colors of one segment (such as a foreground) from the colors of another segment (such as the background) using averages of pixel color values in a region, when segmenting highly textured images with wide variations in color channels, the use of color value averages as the basis of a region force does not produce good results. Instead, the present method and system uses Gaussian Mixture Models (GMMs) to determine the region force to be applied to a single point or pixel within the narrow band on an image. A GMM may be used to determine the probability that the color at a contour point near a group of pixels should be classified in one of a plurality of color classes (or other image data characteristic) in a single segment. A GMM if formed for each segment forming the unknown region of the contour points. For example, the data of a foreground region (or segment) is used to build the GMM foreground model, and the data of the background region (or segment) is used to build the GMM background model. The probabilities can then be used to adjust a region weight value to determine the region force. This more accurately assigns pixel areas to a segment with patterns of alternating colors for example by having the region force move the contour point to a more correct position. Thus, a GMM-based region force fits better for segmentation analysis where the image is textured with many different colors. GMM is described at (https://en.wikipedia.org/wiki/Mixture_model#Gaussian_mixture_model), which is incorporated herein for its content at the time of the filing of this application. The particular details for applying the GMM to obtain a region force to apply to a point are provided below.

These forces are then weighted, summed, and applied to points of the contours in the unknown region to determine a new location for the points. The location is validated by confirming the new location is still within the unknown region. If so the points are shifted to the new locations. This is performed for each iteration. At the beginning of a next iteration, the points are then merged and created to set new positions for the points of the contours before the contours are detected and identified again to redo the active contour iteration loop.

By one form, the weights of the different forces are dynamic. In previous techniques, the weight of each force was fixed during the evaluation, and particularly during the iterations of the active contour algorithm. Instead, now the weights are updated for individual or each active contour iteration, and then applied to the forces before summing the weighted forces. This significantly increases the segmentation accuracy. The weights can be changed depending on the type of contour being analyzed as mentioned above. For example, the sign of a balloon force weight can be changed depending on the type of contour being analyzed. Also, the weights can be changed over time or over a number of iterations to weaken or strengthen a force to which a weight is applied. For example, a smoothness force may be weakened over the iterations (as iterations are performed over time) when maintaining very small contour shapes becomes more important relative to permitting the contour to bend more freely.

In short, the results provide significantly better segmentation in the narrow or unknown band according to a tri-map input. The tri-map is an initial segmentation mask with regions of FG (definite foreground) segment, BG (definite background) segment, and the unknown region cooperatively formed between the segments. The resulting contour in the unknown region adopts the prior segmentation of the FG and knowledge, and can only change within the unknown region. The method and system described herein provides significant segmentation accuracy with real-world color images with complex color arrangements as long as the initial input resides close to the desired output as when limited to an unknown region that is a narrow band at the border of the segments. These features do not affect the run-time of the algorithm significantly, and still meet real-time video speed requirements.

Referring to FIG. 3, process 300 is provided for a method and system of image segmentation refinement for image processing. In the illustrated implementation, process 300 may include one or more operations, functions or actions 302 to 306 numbered evenly. By way of non-limiting example, process 300 may be described herein with reference to example image capture processing system 1000 of FIG. 10, and where relevant.

Process 300 may include "obtain pixel data of at least one image" 302. As explained below, this may include obtaining raw data of pixels and in a color space (such as RGB, YUV, and so forth), and pre-processing raw image data sufficient for segmentation. The result may be obtaining color and/or luminance per pixel and may also include gradient maps, histograms, depth maps, and other image-based data. Also, while operations proceed for a single image, it will be understood that the methods herein may be applied to a sequence of images.

The process 300 also may include "determine a border area cooperatively formed between at least two initially formed image area segments on the image" 304. This operation may include using the image data to generate initial segments, such as foreground and background segments to name one example. The initial segmentation may be performed by using color and/or depth data. The segmentation may be provided in the form of a binary segmentation map. The segmentation map then may be used to set a border area such as an unknown region or narrow band extending along the border between the initial segments so that the more precise segmentation can be applied within or at the unknown region rather than the entire image. By one example, the unknown region is about 10 pixels wide.

Process 300 then may include "determine a location shift to apply to one or more points forming at least one contour in the border area and that separates the segments comprising using an iterative active contour-type algorithm having a plurality of weighted forces applied to the points to modify the position of the points wherein one or more dynamic weights change while performing iterations to adjust a value of at least one weighted force of at least one individual iteration" 306. In other words, contours are found within the border areas or unknown regions, and points on those contours are sampled for applying force against those points to shift the positions of those points, and in turn the contours. The active contour-type algorithm uses at least an internal energy or force such as smoothness and an external energy or force such as a gradient edge force. A region force and a balloon force as well others such as a diffusion force also may be used as described below. The forces are weighted and then summed to obtain a final shift in distance and direction to be applied to a point. By one form, the weights that are used to adjust the forces may be dynamic weights that change for individual or each iteration of the active contour algorithm instead of remaining fixed over multiple iterations. By one form, the weight for a balloon force may be changed depending on the contour type. By another feature, the weights may be intentionally changed iteration to iteration to strengthen or weaken a force modified by the weight. For example, the smoothness force may be weakened as time and iterations are performed and as bending the contour becomes less important relative to preserving minute features of the contour.

By yet another form, when the region force is used, the region force is determined by using one or more Gaussian mixture models (GMMs) to modify the region weight rather than simply relying on color value averages. Specifically, a color value of a contour point of a contour at the border area is determined and that represents a region of pixels. The region force is then determined by using the GMM probabilities to modify the region weight. Each segment forming the border area has its own GMM based on clusters of color (or other image data) in its respective segment. The GMM is used to determine the probability of the color value, and in turn the contour point, should reside in its segment. By one example form, the region force is equal to the region weight multiplied by the difference in the GMM probabilities. The details are provided below.

As mentioned above, an active contour method for unknown regions is described herein that limits the computational load to perform higher quality unknown region segmentation by providing the ability to identify different types of contours and analyze the contours differently depending on the type of contour. The type or differentiating characteristic of the contour depends on the type or characteristic of the unknown region on which it resides. An unknown region, and in turn its contours, may be (1) part of a main border between desired segments or two distinct portions of the image (such as background or foreground), (2) a secondary border that divides one object or area in the image from another object or area in the image when both areas should belong to the same segment (such as part of an image that is an ear or head of a person being undesirably separated from the person's body), and (3) a border around a hole or area of different color or intensity completely or substantially surrounded in one of the segments. The hole often indicates an area of missing correct data of a segment, and hence is the wrong color or intensity that does not match the segment where it is positioned. Once the contours are detected and the type of contours identified, active contour forces or energies may be selected to be applied to points on the contours depending on the characteristics of the contour. For example, a diffusion force may be applied to a main contour but not a hole. Alternatively or additionally, the same type of force may be applied differently to different contours depending on the characteristics of the contour. The balloon and/or region force may be applied in different ways described below. Such customized force combinations depending on the type of contour significantly increases the accuracy of the segmentation. More details are provided below.

By yet another form, the new location of a point indicated by the active contour algorithm may be validated before actually shifting a point to the new location. This operation may determine whether the new location is within the unknown region of a tri-map described above before shifting a point of a contour to the new location. By one form, the shift is only performed when the new location is within the unknown region. In another example, this validation is performed for individual or each point during individual or each iteration of the active contour computations.

Referring to FIG. 4, a process 400 is provided for a method and system of image segmentation refinement for image processing. In the illustrated implementation, process 400 may include one or more operations, functions or actions 402 to 446 numbered evenly. By way of non-limiting example, process 400 may be described herein with reference to example image processing system 1000 of FIG. 10, and where relevant.

Process 400 may include "obtain image data" 402. This operation may include obtaining pre-processed raw image data with RGB, YUV, or other color space values in addition to luminance values for at least one image such as with still photographs or a series of images such as with a video sequence. The color and luminance values may be provided in many different additional forms such as gradients, histograms, and so forth. The pre-processing could include demosaicing, noise reduction, pixel linearization, shading compensation, resolution reduction, vignette elimination, and/or 3A related operations including automatic white balance (AWB), automatic focus (AF), and/or automatic exposure (AE) modifications, and so forth.

This operation also may include obtaining depth data when the depth data is used for segmentation analysis. Depth image data may be determined by a stereo camera system, such as with RGBD cameras, that captures images of the same scene from multiple angles. The system may perform a number of computations to determine a 3D space for the scene in the image and the depth dimension for each point, pixel, or feature in the image. Otherwise, other ways to determine three dimensions from a single camera are possible such as time-of-flight, and structural or coded light technologies.

Other operations that may be considered as part of obtaining the image data is planar detection to reduce the computational load of initial segmentation by efficiently grouping pixels located on the same plane, which often indicates a real world planar surface such as a table top, wall, and so forth. Each plane can be treated as a separate component, and each component can then be classified as a unit as background or foreground (or other segment) as with other components found in the image. As mentioned, this attempts to avoid the errors that occur when a segmentation system places areas on the same plane to different segments. This operation may be performed by known planar detection methods such as Hough Transform, Random Sample Consensus (RANSAC), or others. These planar detecting techniques result in an index map including a list of planes and list of supporting pixels for each plane. Each plane that is detected may be treated as a separate component when multiple planes are detected.

Figure 2:
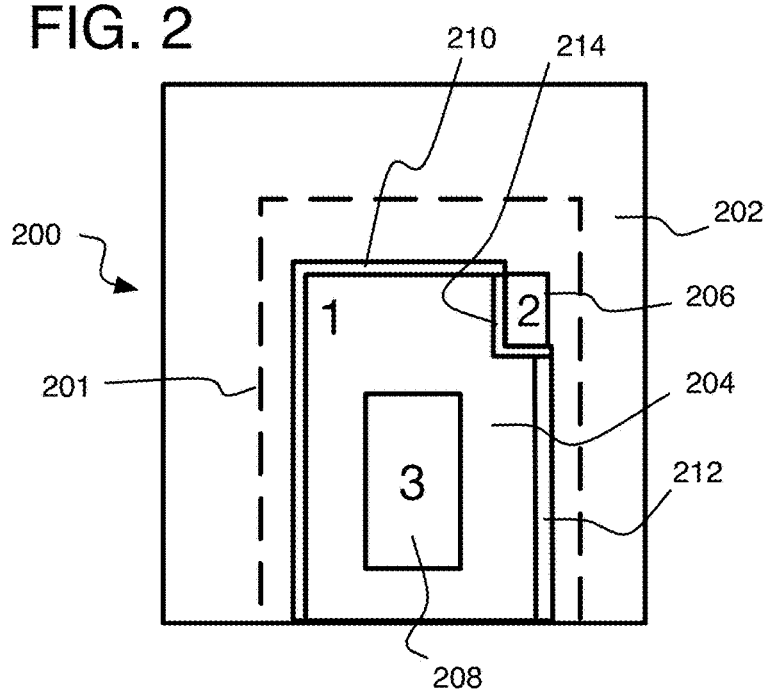
FIG. 2 is a schematic of an image with segmented portions and multiple border areas according to the implementations herein.

Referring to FIG. 2, the process 400 then may include "preprocess image data to generate initial segmentation distributions" 404. This may include obtaining the location of at least one boundary or boundary box on an image, such as a set boundary 201 on image 200 shown in dashed line, which selects the area (or foreground 204) of the image to be segmented from the background 202. A set boundary initially may be established manually by a user or automatically. For example, a user may place the set boundary 201 on the image by writing it on a touch sensitive screen or otherwise by manipulating a cursor or by other devices with a display screen. By another form, a system may automatically form the set boundary 201 for segmentation such as for applications with a certain purpose such as a face detection application, and so forth. By yet other forms, the set boundary may be omitted altogether especially for automatic processes that perform the segmentation for computer vision or video coding efficiency and so forth that will segment objects throughout the entire image.

By some examples, the system performing the processes herein may use settings based on the assumption that the outer boundary (or a bounding box 201) will be set so that the largest object in the boundary is to be part of a foreground mask (the terms foreground and foreground mask may be used interchangeably herein). This is typical when attempting to use a person or group of people as the foreground, or an image of a certain single object such as a car. Many variations are possible.

Rough or initial segmentation may be performed by color-based analysis, depth data analysis, object detection, or tracking object's contour from previous frames to name a few examples. The conventional depth data analysis background-foreground segmentation uses a weighted combination of the color and depth data of the pixels to determine whether the pixels are part of the background or the foreground. See for example, Blanc-Talon et al., *Extended GrabCut for 3D and RGB-D Point Clouds*, Proceedings at Advanced Concepts for Intelligent Vision Systems, 15th International Conference (2013), and Hickson et al., *Efficient Hierarchical Graph-Based Segmentation of RGBD Videos*, Proceedings of IEEE Conference on Computer Vision and Pattern Recognition (CVPR) (2014). These methods describe a graph cut approach that is extended by creating node weights based on both RGB and depth. These methods attempt to "fuse" depth and color information at a low level for an entire area that is to be segmented. Other methods may use depth data for determining a rough or initial segmentation that forms the narrow or unknown bands described herein, and then uses color or luminance data to perform the more precise segmentation at the unknown regions, also as described herein. Many variations are possible.

Accordingly, process 400 may include "obtain segmentation mask" 406. Specifically, the initial segmentation may result in a segmentation map or binary map that labels each or numerous pixels with a 0 or 1 to indicate which segment the pixel belongs.

Process 400 may include "set initial unknown regions" 408. Referring to FIG. 2 by one form, the initial segmentation results in unknown regions 210, 212, and 214 (which may be considered parts of a single unknown region or band). The unknown regions are located along the border of the initial coarse segment (object, or mask) 1 (204) which could be a foreground mask. A coarse segment (object or mask) 202 could be a background mask. By one example, the unknown region or band extends along the entire border between the initial segments, but could be set shorter (such as at more visibly inaccurate areas). The unknown region may extend half into one segment (the background side) and half into the other segment (foreground side), although variations could be used as well. The unknown region alternatively may have a varying width as well. Specifically, contours within the unknown region are the input to the active contour algorithm described below, and a penalty is asserted to any change from the initial set such that points shifted outside of the unknown region are ignored, but a maximum distance limit within the region is not enforced either. The unknown region width may be fixed, and by one example is set at about or exactly 10 pixels wide, and this width may be maintained for the length of the initial rough segmentation. The setting of the unknown region may be performed by such techniques similar to parallel curve or other similar shaping techniques (see for example, en.wikipedia.org/wiki/Parallel_curve).

As shown on image 200, a number of different types of border areas or unknown regions may be formed on a segmentation mask that results from the initial segmentation. Thus, the unknown region defined between two segments where the initial segmentation is desired (and generally correct except for within the unknown region), this is referred to as a main border 210 and 212, and the contour of the segmentation at the main border may be referred to as the main contour depending on the context. As explained below, the main contour is assumed to be the longest contour in the image. A secondary border (or unknown region) 214 may be formed between objects or segments 1 (204) and 2 (206) where segment 2 should have remained as part of segment 1. As mentioned with images A3 and B3 (FIG. 1), one possible example shows that a hair part 106 of a segment (image A3) is in the wrong segment rather than the segment with the remainder of the person, while similarly an ear part 108 also should be switched to the adjacent segment with the remainder of the person. This is performed by removing the secondary unknown band 214 as explained below.

A third structure of border with a contour in a narrow band or unknown region is referred to as a hole 3, or more accurately surrounding a hole (208 on FIG. 3), where an area is entirely, substantially, or at least mostly surrounded by another segment area where the hole area provides the wrong colors (or luminance) for the segment. The holes are referred to as areas that are missing the correct image data.

The next operations are to "identify location of contours at unknown regions" 410 and "identify contour types" 412. Thus, each unknown band has one or more contours within the unknown region, and the contours may be very long (defining the outer edge of a large segment such as the foreground) or may be very short with lengths of several pixels (as explained in detail below). These contours are also identified as main, secondary, or holes depending on which unknown region the contour resides and/or the shape of the contour. As explained below, the active contour algorithm then treats these contours differently depending on the type of contour.

In operation, a function is used to identify and classify the contours into types. This may simply include providing the binary segmentation map of the entire image to the function so that the function actually finds the unknown regions, the contours within the unknown regions, and the contour type for each or individual contours. This may be performed without actually first identifying unknown regions although that is the effect of the function. By other alternatives, the unknown regions of an image may be identified manually or automatically by analyzing the initial segmentation map by a separate algorithm or module than the function performing contour identification.

The function used to perform at least the contour identification and contour type classification, and very well may include the unknown region identification as mentioned, may be the openCV find contour function. See, for example, the find contour function as described by: http://docs.opencv.org/2.4/modules/imgproc/doc/structural_analysis_and_shape_descriptors.html #findcontours, and Suzuki, S. and Abe, K., Topological Structural Analysis of Digitized Binary Images by Border Following. CVGIP 30 1, pp 32-46 (1985). Thus, the initial segmentation map of the entire image (or parts of the image where segmentation is desired) is provided to the function, and the function extracts all the contours of the image, and classifies the contours by type.

The find contour function obtains the segmentation map and looks for components. A component is a set of adjacent pixels either connected four-wise which includes adding pixels to the component that are adjacent to a pixel at a pixel's right/left and up/down sides, or eight-wise which adds pixels that are diagonally adjacent to a pixel's upper left, upper right, lower left, and lower right corners. The present methods here may use the four-wise component building structure. The entire image may be divided into components where only those within or close to unknown regions are identified and provided to the active contour algorithm, or only those image areas at or near an unknown region are analyzed by the find contour function. Each component may be considered an object or segment on the image and should have a uniform numbering (1 or 0) on the map. These components can be very small (a few number of pixels) and there may be many components in a single unknown region. The component, and in turn its contour, can also be very large defining a main contour around a foreground segment for example. The find contour function labels every connected or adjacent component with a different label. There are labels which represent 0-components, and labels of 1-components. Every border which separates two components is a contour.

Each component, and its contour, is analyzed to determine the contour type. First, a 0-component which isn't touching the "frame" or the first and last columns and rows of the image is a hole. All the 1-components are contours of the shape (object) itself. The contours that are not already determined to be holes are then compared to the previous contours analyzed to determine which contour has the maximum enclosed area. The contour with the maximum enclosed area is set as the main contour. The enclosed area may be defined by the contour alone or with the edge of the image as one or more sides of the enclosed area. Those contours that have less than the maximal area are set as secondary contours. Each contour being analyzed that is not a hole has its area compared to the maximum area. This process is listed in pseudo code provided below. Other variations for classifying the contours exist and may include object-recognition type classifiers where pre-trained classifier methods search for specific objects such as whether a contour appears to be the contour of a person, face, or facial feature for example.

By one form, the find contour function also can be used to identify more complex structures by using a feature that provides a full hierarchy of the contours. This may identify objects inside holes and so forth.

The output is stored as a vector of points for each contour as well as an indication as to which type of contour it is (main, secondary, or hole). The type of contour may simply be provided as type 0, 1, or 2. The color and/or luminance image data as well as the masks of the known regions (the initial segmentation that is not at an unknown region) also may be provided to an active contour unit that performs the active contour algorithms.

Figure 6:
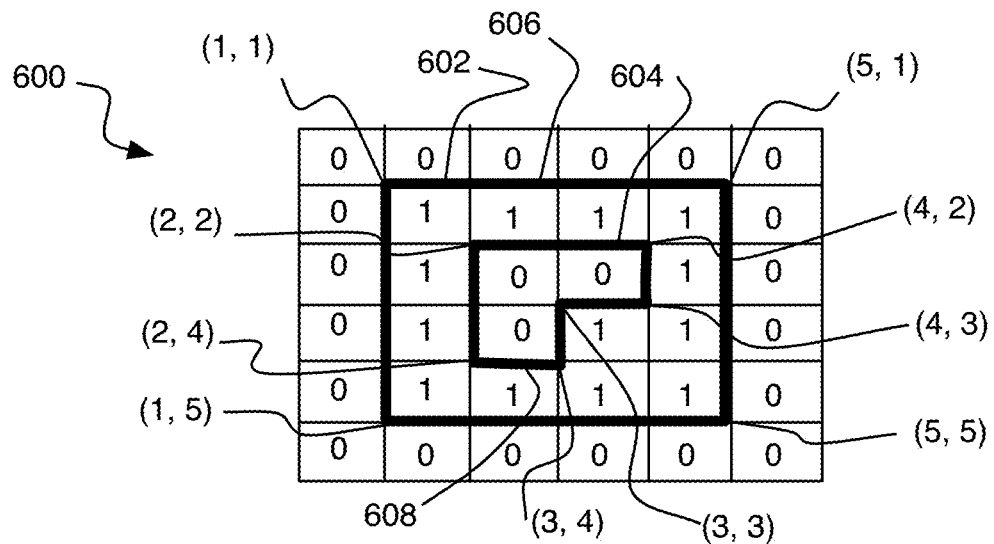
FIG. 6 is a diagram showing an input segmentation map and contours for implementing the segmentation methods disclosed herein.

Referring to FIG. 6, as to the form of the contours, the components (or objects or segments) may be represented by a full matrix such as a binary segmentation map that shows where adjacent pixels have different segments. A border contour then is formed by the pixel sides or edges between those opposite pixels. By another way, the contours are listed as a series of junction coordinates. Particularly, as shown, a binary segmentation map 600 is provided where each adjacent segment (object or component or shape) has its pixels labeled with a different value (0 or 1). The shape or object 602 with 1s has a contour 606 with five points (where indexing starts from 0) and including points (1, 1), (5, 1), (5, 5), (1, 5) and (1, 1) again to close the rectangle. This representation may be referred to as the "minimal representation" because it is the minimal count of points (five) to fully represent the rectangular shape that is shown.

The active contour algorithm also uses a relatively dense representation of the contour. Thus, a constraint may be placed on the distance between two adjacent points along a contour between two to four pixels, for example. Less than that, and the points are merged, more than that and another point is created between the two existing contour points. Maintaining points along a contour in close proximity to each other is performed so that more complex shapes can be created than the input shape. If for example, a contour starts with five points, the last point is the same as a first point to close the shape and form a rectangle. If no way exists to add more points, there would never be a way to represent shapes which have more than four sides. The process of merging and creating new points is called "resampling", and is performed in the beginning of every iteration as described in greater detail below.

Segmentation map 600 also has a hole 604 indicated by a 0 for each pixel location inside the shape or hole 604. This shape 604 has a contour 608 with seven points including (2, 2), (2, 4), (3, 4), (3, 3), (4, 3), (4, 2) and (2, 2) to close the loop. Thus, the find contour function extracts the contours 606 and 608 from the binary segmentation mask 600, and forms a list of points forming each contour. The list of points are provided to the active contour algorithm in the form of a vector for each contour by one example. Thus, the active contour algorithm works on the contour point listings rather than the binary segmentation masks. These contours, again whether as small as the minimal examples shown in FIG. 6 or very large to effectively be the main contour at a large segment such as a foreground, may be provided one by one to the active contour unit for shaping of the contour.

Process 400 may optionally include "determine which forces to apply and/or how to apply at least one force depending on the type of contour" 414. The active contour algorithm receives the contours (the lists of points on the contours) that indicates the location of the contour as well as the type of contour for each contour located on or at least partially overlapping one of the unknown regions. The active contour unit will apply the same type of weighted forces in the same way to all (or substantially all) of the points on a single contour in a single iteration although which weighted forces are applied and how the forces are applied still may change from iteration to iteration for single contour.

As mentioned, the active contour algorithm minimizes an energy function associated with a contour. The energy function is an iteratively minimizing equation where internal energy controls the deformations to the shape of the contour while external energy controls fitting of the contour onto the image (or in this case, the border of a segment). A final contour, by its final point positions, is returned as output. One such active contour technique is provided by Mille, *Parameterized Narrow Band Active Contour*, Université François Rabelais de Tours, Laboratoire Informatique (EA2101) (http://liris.cnrs.fr/Documents/Liris-4476.pdf). For the present method, 100 iterations may be performed, and by one example with 10 passes at each iteration, and after each iteration, the global properties are updated as the color of the foreground and the background. A pass refers to an iteration with an active contour calculation to move the contour points to a convergence for the iteration, and where the points may not be resampled point to point. The weights also may not be changed, pass to pass. This may be performed to increase performance. Thus, many variations are possible such that resampling and updating of the weights need not occur every iteration.

As to which forces are applied to a contour, for each or individual points in a contour provided to the active contour unit, the active contour algorithm calculates the forces, and in turn the weight to modify each force, and that is to be applied to a point. As mentioned above, the forces may include an external force such as a gradient or edge-based force and an internal force such as a smoothness force. By one example form, these two forces always may be present for each contour no matter the contour type.

The active contour algorithm uses or does not use at least one force depending on the type of contour. For example, a diffusion force is not used when the contour is labeled as a hole but the diffusion force is used when the contour is labeled as a main contour or a secondary contour. The diffusion force is a refinement force that reduces the sensitivity of the contour to noise, clutter, and occlusion by implementing a Mumford-Shah type of function with a cartoon limit and other statistical shape knowledge. For example, such a diffusion force is described at least at https://en.wikipedia.org/wiki/Active_contour_model#Diffusion_snakes_model. Such a diffusion force may be helpful to segment people shown in an image for example where proper shaping of the contour is very important, but no reason exists to use the diffusion force when eliminating a hole. Other weighted forces that may be available, some of which are mentioned below, also may be used or omitted depending on the type of contour.

By another feature, weight forces may be applied differently depending on the type of contour even though the contours are using the same, or same type or class, of force. For example, the balloon force will be applied differently depending on the type of contour. Specifically, many holes in the segmentation mask may begin very small such that the active contour algorithm may not treat the hole properly. The active contour algorithm may shape the hole into something undesirable when the contour points forming the hole are very close together such that the active contour algorithm may shift the points to the same edge thereby forming a line with no area for example. Thus, when the type of contour is labeled as a hole and the size of the contour, determined by its point locations, is extremely small, in these cases the balloon force is at least initially applied to expand the hole by applying a positive balloon force (and weight) that removes the shape (or object or segment) area around the hole to enlarge the size of the hole.

In later iterations, when the hole is provided with a larger size, now a larger force or weight may be provided to the balloon force, but with a negative sign, to expand or pull the area of the surrounding shape (or object or segment) into the hole to shrink the hole or ideally to entirely eliminate the hole.

Otherwise, when the contour type is the main contour, at least a weak positive balloon force may be applied to the points of a main contour as another balancing or compensation energy to reduce contour shrinkage toward a single curve or line caused by the weighted smoothness force. The ideal shape when only smoothness is considered becomes a single curve in the form of a perfect circle, and if the smoothness force is continued to be applied, the circle will eventually shrink until collapsing. The weak balloon force will at least offset this property of smoothness and permit multiple curves in a zig-zag shape for example.

When the contour type is secondary, a positive larger balloon force or weight may be applied to the points of the secondary contour to attempt to collapse the unknown region and eliminate the secondary contour. Since the contour is labeled secondary, it is assumed that the separation of a secondary segment or shape (such as shape 2 (206) of FIG. 2 for example) from the main segment 1 (204) is not desired and occurred due to missing the correct data. Thus, applying the large positive balloon force to expand the secondary segment 2 (206) to or into the segment 1 (204) may merge the segments and eliminate the secondary contour (and its unknown band).

As to the adjustment of a region force depending on the contour type, and as explained in greater detail herein, a representation color (or luminance) is determined for a contour point based on the colors of a group of pixels near the contour point. The color of the contour point is then plugged into GMM equations where each GMM represents a segment forming the contour at issue. The GMMs provide the probability that that contour point is within the indicated segment by the similarity of the point's color to the colors in the segments. The two probabilities are then used to modify the region weight to determine a region force value. The GMMs are each formed by using clusters of data within their segment, such as pixel color data. The largest object 204 in the image that has a main contour type (or a main contour) such as contour 210 and 212 on FIG. 2 may be selected as one segment (the foreground), and the background 202, secondary object, 206, and holes 208 form the other segment may be selected as the background, where the background and foreground each is a basis of its own GMM. By another option, the GMM also may be different depending on the contour. For example, for the secondary contour 214, object 206 may be considered the foreground, while the initial background 202 (and holes 208) and the main foreground 204 are all considered to form the background segment to determine the GMMs of the segments for the secondary contour 214. Many variations exist.

It will be appreciated that providing a customized mix of forces depending on the contour type can be an optional feature. Thus, some of the other features of the segmentation methods described herein such as using GMM to establish a region force and dynamically changing the weights for individual or each active contour iteration optionally may be performed without changing the type and application of forces depending on the contour type.

Once the forces and application of the forces is selected for a contour based on the contour type, process 400 is then ready to proceed to "determine dynamic weights" 416. The weights are calculated as follows.

The active contour algorithm is performed by calculating the shift that is to be used to re-position a point on a contour by applying the summed weighted forces as follows:

$$[x,y]_{shift} = \Sigma_{feForces} \text{Weight}_f \cdot f([x,y]_i) \quad (1)$$

Assuming the balloon, smoothness, region, and gradient forces are to be applied to a point, this equation becomes:

$$[x,y]_{shift} = W_b \cdot b(x,y) + W_s \cdot s(x,y) + W_r \cdot r(x,y) + W_g \cdot g(x,y) \quad (2)$$

where b is the balloon force of a point (x, y), and $W_b$ is a balloon force weight, s is a smoothness (or internal) force at the point, Ws is the smoothness force weight, r is the region force, Wr is the region force weight, g is the gradient (or external) force, and Wg is the gradient force weight, and where each weight is used to set or adjust its corresponding force value, and where the weighted forces are to be summed and then applied to a single point in the contour between two segments such as the background and foreground of an image.

The weights $W_s$, $W_g$, $W_b$, and $W_r$ are all predetermined by trial and error to determine an initial range, and then brute force to attempt to obtain the ideal set of weights. Thus, by one example, experiments were performed to determine the weight values that provide the best results. These are kept as the initial weights for the active contour algorithm. The weights that may not change, such as the gradient weight, may be fixed at a single value for all of the iterations. However, for those dynamic weights that change depending on the contour type, such as the balloon force, the sign of the weight may be changed depending on the detected contour type and desired weight as set from operations 412 and 414 when the contour type detection is provided.

Similarly, operations 412 and 414 may indicate an intentional (or manual) targeted change in weight value over time is to be used. For example, in the beginning, weight of the internal forces that resist deformation (such as the smoothness force, striving for smooth curves) is maintained at high values. The weight value for smoothness, however, may be decreased over time as the iterations continue. This better ensures that minute features are not ignored near the end of iterations when resistance to deformation is more acceptable. By example, the smoothness weight $W_s$ may be adjusted from about or exactly 0.15 at the first iteration and in uniform increments to about or exactly 0.5 by the last iteration. This also was determined by experimentation. The result may be a pre-set set of incremental smoothness weights to provide for the iterations or may be calculated from a single initial weight to obtain the incremental weights. It will be understood that many different intervals may be used whether based on a curve and so forth such that the increments are not necessarily uniform from iteration to iteration.

As mentioned, while four weights are shown (smoothness, gradient, region, and balloon), there may be others, or less than these four forces may be used (such as at least smoothness and gradient forces).

The process 400 may include "determine weighted forces to apply at points of the contours" 418. The forces are determined for each or multiple points in a single contour, and then contour by contour, either overlapping or starting the next contour when the prior contour is finished. By another example, the forces are determined simultaneously such as one point for all contours, then the next point for all contours, and so forth. Thus, process 400 may include "obtain first/next point" 420, and the next point to be used to determine the force values (and to which the weighted and summed forces will apply). It will be appreciated that actually the computations of forces and weights may be determined in parallel by one or more CPUs and/or graphics processor(s) for example.

Process 400 may include "determine internal force" 422, which includes at least the smoothness force s(x, y). The smoothness force attempts to make the contour more smooth and without zig-zags. The smoothness force pushes the points of a contour toward an average position between a previous and succeeding point along the contour. The contours may be chained so that the last point of the previous contour may be treated as the first point of the next contour. The force may be determined in both x and y directions by using the equation:

$$\text{smoothness} = 0.5*(\text{PointPosition}_{nextPoint} + \text{PointPosition}_{previouspoint}) - \text{PointPosition}_{currentpoint} \quad (3)$$

The resulting smoothness force is then a distance (or a shift) to move a point (that is modified when multiplied by the smoothness weight).

Also, process 400 may include "determine external force" 424, which at least includes the gradient force. The gradient force uses the gradients on the image, which are differences in color from pixel to pixel (or other selected pattern). The gradient force pushes points of the contour toward gradients because large gradients indicate edges of objects in the image which are more likely positions to be a proper border between adjacent segments.

The gradient force is determined by using a Sobel Operator (with a kernel of size 1*3 for x and 3*1 for y) to detect the edges of the image. Next, a Gaussian Filter\Gaussian Blur (kernel of 7*7, sigma is 2) is used. Gaussian blur is used so that pixels near the edge will get values that will make the pixels stick to the edge (where the pixels get the color value the same as at the edge). A matrix is then used (if the size of the image is n*m, the new matrix is n*m*2), as for every point (x, y), where each entry to the matrix is a gradient of the edge. The edge is located where the difference or gradient between two sides of a line is a maximum. Thus, the gradient force is determined at the current contour point by:

$$\text{Gradient} = \text{GradientMatrix.at}(\text{PointPosition}_{currentPoint}) \quad (4)$$

where gradientmatrix.at refers to the matrix of n*m*2, where 2 matrices are provided, one for x and one for y. The result of the Sobel operator on the x gives us the needed shift in x, and the same on y. So by taking the 2 values of the matrix in the given point, we get the resulting value as a distance to move a point (that is multiplied by the gradient weight) with two (x, y) values where the sign of the values indicates direction. These values are then multiplied by the weight as explained below.

Other forces that could be part of the external force include a line force that indicates the intensity of the image and determines whether a line will be attracted to dark or light lines. Yet another force is a termination force that detects corners and terminations in an image. Otherwise, a constraint force may be used that may factor in user preferences in initial contour placement and energy terms that may be used to guide the contour towards or away from particular features in the image. Other forces (and their weights) also may be used and selected contour to contour or modified for different application method depending on the contour type.

Also, process 400 may include "determine balloon force" 426, and where the balloon force is a fixed push to make the shape bigger or smaller (referring to the radius of the curve of the shape or snake) according to the normal of the point. It may be used when the result is outside or inside an initial guess, and it is desirable to overcome minute features such as small holes. The balloon force determines a normal from the direction of the contour being analyzed and adjusts points of the contour along the normal. When the balloon is to be expanded, creating a larger hole by moving the segmentation contour farther away from the hole's center for example, the balloon weight to be applied to the balloon force should be positive. Oppositely, when the balloon is to shrink, and thereby shrink a hole and move a segmentation contour closer to the middle of the hole for example (or expanding the surrounding segment or object area into the hole), the balloon weight should be negative. Assuming a point position upon which the balloon force is applied is a coordinate pair (x, y), the equation for the distance and direction forming (or at) the normal is:

$$\text{middleposition} = \text{pointposition}_{nextpoint} - \text{pointposition}_{previouspoint} \quad (5)$$

$$\text{denominator} = \sqrt{\text{middleposition}.x^2 + \text{middleposition}.y^2} \quad (6)$$

$$\text{normal}_x = -\text{middleposition}.y/\text{denominator} \quad (7)$$

$$\text{normal}_y = \text{middleposition}.x/\text{denominator} \quad (8)$$

where $\text{pointposition}_{nextpoint}$ or $\text{pointposition}_{previouspoint}$ are next and previous points adjacent the current point being analyzed and along the contour being analyzed, middleposition is the linear difference (or distance) between the next and previous pointpositions, the middleposition.x and middleposition.y are the x and y components of the middle position. It will be understood that this is one example way to calculate the balloon force and that there are others. The result is a shift that indicates a distance and direction such as a shift (x, y) where the x and y values are the distances and the sign of each values indicates direction. The weight is multiplied by both of the x and y values to obtain a weighted force x and y.

Process 400 may include "determine region force" 428. The region force attempts to differentiate the colors of one segment (such as the foreground) from the colors of another segment (such as the background). Instead of merely color gradients or averages, the region force here uses Gaussian Mixture Models (GMMs). The mechanics of the GMM are disclosed by, for example, https://en.wikipedia.org/wiki/Mixture_model#Gaussian_mixture_model. Here, the GMM may be run for about or exactly 10 iterations to establish the GMM based on five clusters. The GMMs provide a more accurate region force where the image is textured with many different colors.

Thus, process 400 may include "use GMM to determine region force" 430. This operation may include an initialization part where two GMMs are initialized, one for an image area that is definitely in one segment (such as the foreground), and another GMM for the area of the image that is definitely within another segment (such as the background), where the two segments cooperatively form or border the unknown region (and the region's one or more contours) at issue. A number of clusters are then formed for each segment, and in turn each GMM. In one example, five Gaussians (or clusters) for each GMM are used. Also, the clusters use the pixel color data, but could be based on other data such as luminance. By one form, each cluster includes one of five most used colors in the segment. By one example, a pixel is counted as included in the cluster when the color value for that pixel is either exactly the same as other pixels forming the contour or the color space values are at least within the same range, such as ±5 for a single color value when provided or each of the three RGB (or other) color space values by one example. A GMM is then constructed with the five clusters so that the color at a contour point being analyzed can be inserted into the GMM equation to determine the probability (or similarity value) that the color at the contour point location belongs with the colors of the segment. This is performed to attempt to make a good separation between the colors of the two segments. This is applied to individual or each point of a contour being analyzed. When the color of the contour point has a probability that indicates a strong likelihood to belong to one of the segments or distributions, a region force equation is used to modify the location of the contour point in a way that pushes the contour point away from its current location or area and in a direction so that the current area of the contour point is kept in the segment with more similar colors. The contour point may be moved along a normal of the contour at the current location of the contour point.

Figure 7:
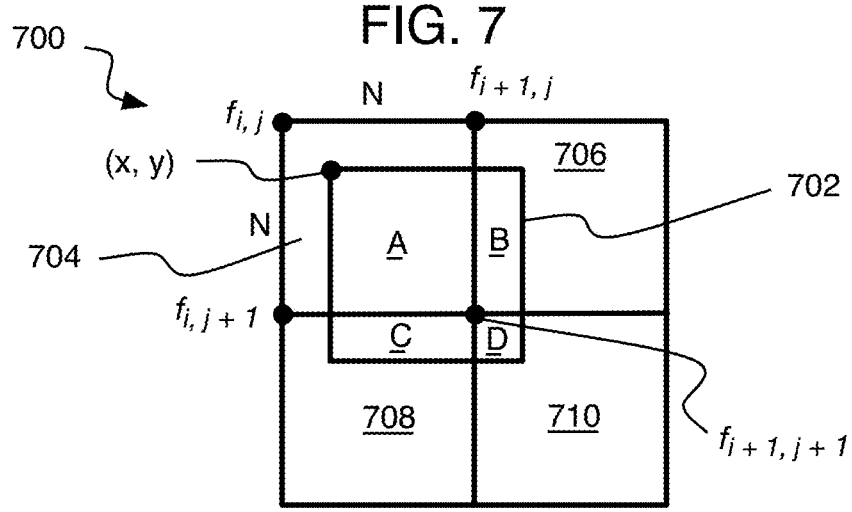
FIG. 7 is a close-up schematic view of pixels on an image used to determine a color value for a contour point to calculate a region force according to the segmentation refinement methods disclosed herein.

Referring to FIG. 7, the color value of the contour point is a representation of colors from a region or group of pixels near the contour point. Specifically, by one form, a sub-pixel two-way interpolation (or weighted sum) is used that takes the relative part from each of four discrete pixels as shown on pixel map or close-up image 700. For this example, x and y are the indices of a contour point which aren't integers. The location (x, y) of the contour point may be considered to be a left, upper corner of a floating or shifted pixel 702. The color at the contour point (or the shifted pixel) is determined by a weighted sum of the surrounding four pixels, where the weight of each pixel is the intersection area (or overlap) of the surrounding pixels with the shifted pixel:

$$\begin{aligned}\text{new pixel color} = &\text{Intersection}(\text{Pixel}(I,j),\text{Pixel}(x,y))^* \\ &\text{Color}(I,j) + \text{Intersection}(\text{Pixel}(I,j+1),\text{Pixel}(x,y))^* \\ &\text{Color}(I,j+1) + \text{Intersection}(\text{Pixel}(I+1,j),\text{Pixel}(x,y))^* \\ &\text{Color}(I+1,j) + \text{Intersection}(\text{Pixel}(I+1,j+1),\text{Pixel}(x,y))^* \\ &\text{Color}(I+1,j+1)\end{aligned} \quad (9)$$

where (x, y) is a point on the contour being analyzed, and also is set as the upper left corner sub-pixel location of a pixel area on the image and is divided into intersection (or overlapping) areas A, B, C, D of pixel 702 on image 700. Pixel or f locations on image 700 are the upper left corners of actual pixel areas 704, 706, 708, and 710 forming the image. The areas A, B, C, and D represent the intersection( ) or overlap from equation (9) with each of those four pixel areas 704, 706, 708, and 710. The color( ) from equation (9) is the color value of that actual pixel. And is multiplied by the corresponding intersection area. Thus, equation (9) performs a type of two-way interpolation or weighted sum to determine the color value for the contour point (x, y). It should be noted that a single color value may be used or the interpolation may be performed for each of the color space values, such as three times for three RGB values.

The contour point position or coordinate values being used are integers rather than any fractional value. This is true for the other forces as well. In the output, the results are rounded to the nearest integer. To further demonstrate the region force shift, consider for example, a single dimensional line of pixels with pixels lined up at positions 0 to 100, and all the pixels until 40 are surely foreground, and starting with 50 and up are surely background. The pixels until pixel 45 are blue, and after that to 100, the pixels are all red. The point being examined is at 43 which is entirely blue. Thus, the similarity of the color to the foreground is much higher than the similarity to the background, so the point should be pushed in the direction of the background to keep that blue 43 location with the foreground. The point is pushed according to the normal. By this example, assume the push is 1.2 pixels. In the next iteration, the same point is considered, and is now at 44.2. Now most of the pixel (which has a width from 44.2 to 45.2) being examined is blue from 44.2 to 45, but it also has a bit of red from 45 to 45.2, because of the sub-pixel location. Since the difference in area is smaller (0.8−0.2=0.6 versus 1−0=1 before), the push now will be weaker. Assume the push is now 0.6 pixels to the right toward the red end. Now the value is 44.8, and the pixel is more red than blue, so the force will push it to the left a bit, and thereafter oscillate (from iteration to iteration) around 44.5 closer and closer, until it will eventually reside on 44.5, were the similarity is equal, and the push is 0. This is how the region force will operate except in both the x and y direction.

The strength of the push is the weight of the region force, multiplied by the difference of the outside and inside probabilities. So, while examining point p, the region force may be as follows:

$$\text{Region\_force} = \text{weight\_of\_region\_force}*(BS-FS)*\text{normal}_p \quad (10)$$

where:
FS=Foreground_GMM.probability_Of_Belonging(Color.subsample_at(p)),
BS=Background_GMM.probability_Of_Belonging(Color.subsample_at(p))
or in other words, the FS is foreground similarity, BS is background similarity, and where $\text{normal}_p$ is the normal from the point (in other words, in the normal direction from the contour) and is calculated as explained above for the balloon force. Color.subsample_at(p) is the color value at the contour point. As mentioned, if the pixel is more similar to the foreground, the middle term (BS−FS) will be negative, and the push will be in the opposite direction to the normal. Otherwise, it will be according to the positive direction of the normal.

The resulting region force and the region weight used here to form the region force is the weighted force summed with the other weighted forces for application to the point. Thus, the region weight here is the dynamic weight that changes iteration to iteration depending on the new location of the point being analyzed. The weight may be computed by trial and error and/or brute force.

Then, process 400 may include "determine weighted sum for individual points" 432, and therefore, each force is multiplied by its corresponding weight (or the force is formed by already factoring the weight), and then the weighted forces which are now all distance and direction values are summed together as shown in equation (2). The result is a final shift distance and direction for each point being analyzed in the form of (x, y) where the x and y values indicate distance and the sign of the values indicate direction. For example, shift (1, 1) and shift (2, 2) have the same direction, but different distance. Shift (−1, 0) and (1, 0) shares the same distance, but with opposite direction. By one example, this same output, a shift in (x, y), is provided by each of the forces. The normal of a point is used as one example direction for such a shift. The balloon forces uses the normal directly with a fixed weight, while the region-force is weighting the normal shift according to the difference in the colors, using the GMM as explained herein.

The shift can be added or subtracted to the current point location to "determine new position of point" 434. By one form, the logic is applied so that one of the operations (adding or subtracting) is used with all points for simplicity, and the sign of the shift is changed to indicate a change in direction rather than switching between the two operations. Once calculated, the new location can then be validated before the point is actually moved to the new location.

Process 400 may include "validate position of point is on unknown region" 436. Then, it is validated whether or not the location of the destination point is still in the unknown region (or area or band) of the tri-map, and not the definite segment areas of the tri-map. This incorporates the prior knowledge of regions that the contour should not cross into. The shifts of all the forces can be calculated in parallel for each iteration, while validating that the point is in the unknown region during the iteration. The calculation may proceed as follows:

If KnownRegion at $[x, y]_i+[x, y]_{shift}$ is at unknown region, then:

$$[x,y]_i=[x,y]_i+[x,y]_{shift} \quad (11)$$

where KnownRegion is a matrix that can contain three values: foreground, background, and unknown. Thus, process 400 may include a query "destination point in unknown region?" 438. If so, equation (11) is performed and the process 400 may include "shift point to new position" 440, and the point is then moved. Otherwise, the point is kept at its current position and is not moved.

Figure 8:
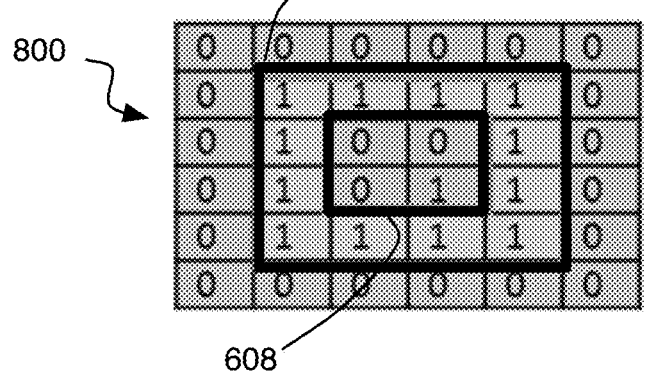
FIG. 8 is a diagram showing a resulting output segmentation map and contours formed by implementing the segmentation refinement methods disclosed herein.

Referring to FIGS. 6 and 8 as one example, the segmentation map 600 of an image is shown where the components are divided by the input contours provided to the active contour algorithm. In this example, pixel (3, 3) is marked as a 1 but has the color of the adjacent 0 pixels. Thus, the initial contour 608 forms a point (3, 3) that excludes the pixel (3, 3) from the inner component 604 despite the matching color. As shown on map 800, however, after the contours are analyzed by the active contour algorithm and while using a region force, the contour 608 of component 604 is modified, and contour point (3, 3) is shifted to include the pixel (3, 3) with the other three inner pixels marked 0 in component 604 but of the same color, and as long as the point is within the unknown region.

Process 400 may include "last point?" 442 to check that all points of all contours (or at least the contours of the unknown band or region) have been analyzed for the iteration, and the system shifted those points that should be shifted. If not, the process loops to operation 418 to analyze the next point, and again this may be performed contour by contour, or parallel operations may be performed. If the last point of the last contour has been analyzed and shifted when needed, it is determined whether the last iteration was performed 444.

If the last iteration has not been performed, the process then re-samples 446 the points by merging points or creating points on the contours where needed, and according to the continuity limitations that sets the maximum distance between adjacent contour points along a contour. As mentioned, when shifting contour points results in two adjacent points along a contour being more than some set distance apart, such as four pixels, then a new contour point is set at the midpoint between those two points. When two contour points are less than two pixels apart, then those two points are merged into one point at a midpoint between them. If a sub-pixel location results, that sub-pixel location can be rounded to a whole number for setting the point location.

Once the contour points are re-sampled, then the process 400 loops to identify contour types again, determine which and how forces are to be applied to the points, and re-compute the dynamic weights. The process 400 then proceeds with the next iteration. Thus, by one form, all of the points are updated in parallel in each or individual iterations, but the processing of all points must be finished before changing the weights for the next iteration.

When the last iteration is performed, the contours may be converted back to segmentation map by openCV DrawContour for example, and the completed segmentation map then may be provided to other applications for use of the segmentation.

The pseudo-code including contour type identification of process 400 may be provided as follows:

```
Refine contours (BinaryMask inputMask)
List of <contours and whether it's a shape or a
hole> = findContours(inputMask)
maximalOuterContour = contour which is not a hole with
maximal area for each contour:
    if current contour was marked as a hole by step 1,
    type = "Hole",
    else if current contour equals maximalOuterContour,
type = "Maximal Outer Contour"
    else type = "Secondary Outer Contour".
    currentRefinedContour = ActiveContour(current contour,
    type)
    Add currentRefinedContour to the list of resultContours.
    outputMask = Use openCV's drawContours(resultContours)
    return outputMask
```

Referring again to FIG. 1, the results of the segmentation by the process disclosed herein are shown on image A4 and B4 where the border is now smooth and correctly separates a final foreground mask from a background. Referring to FIG. 5, a chart is provided that shows the significant improvement of the present active contour methodology versus prior known active contour implementations.

Figure 9:
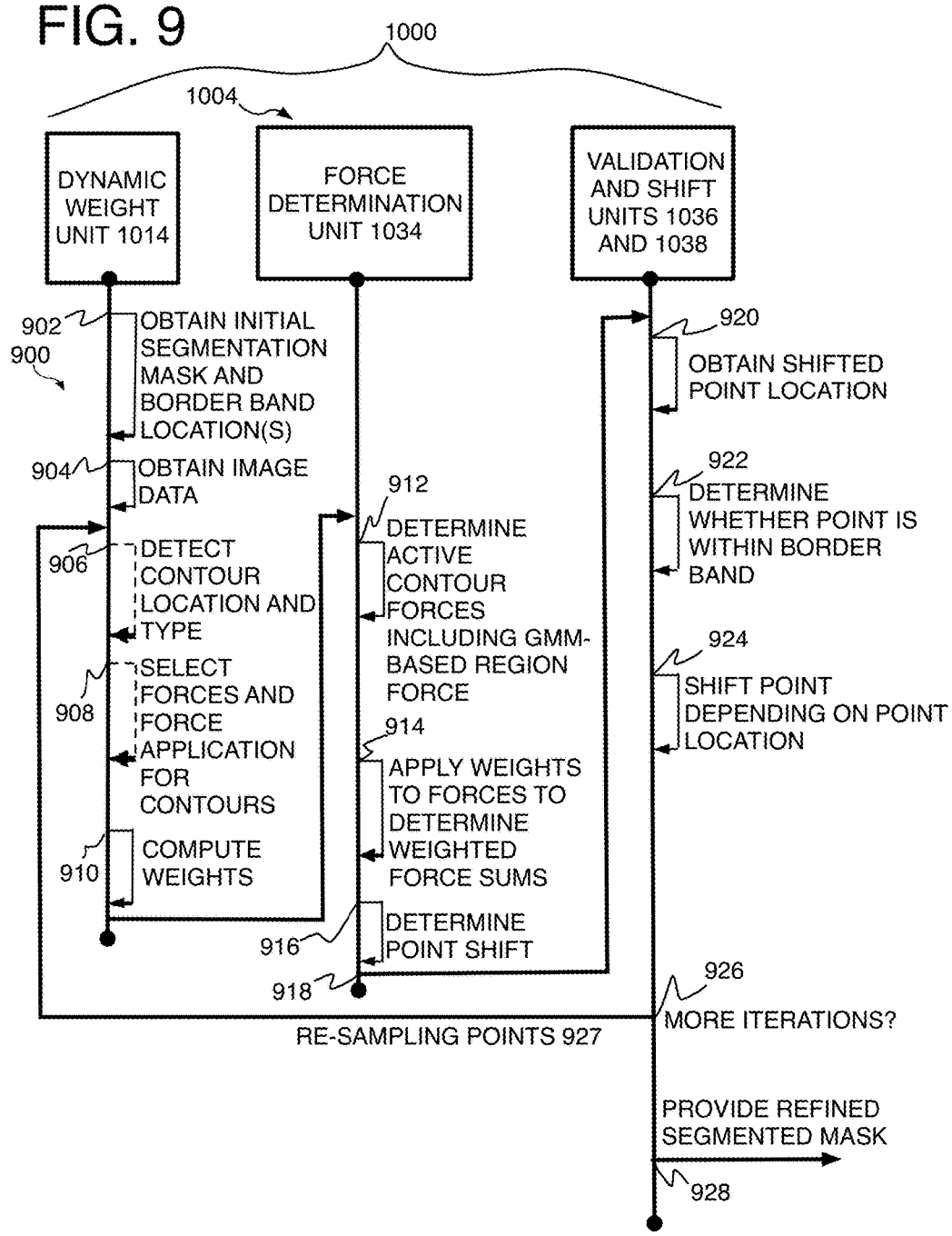
FIG. 9 is a diagram of the image segmentation refinement method in operation of an example system described herein.

Referring to FIG. 9, process 900 illustrates the operation of a sample image processing system 1000 for image segmentation refinement for image processing in accordance with at least some implementations of the present disclosure. In more detail, in the illustrated form, process 900 may include one or more operations, functions or actions as illustrated by one or more of actions 902 to 928 numbered evenly. By way of non-limiting example, process 900 will be described herein with reference to FIG. 10. Specifically, system 1000 includes logic units or modules 1004. The logic modules 1004 may include a raw image handling unit 1006, a depth map generator unit 1008, a planar surface detection unit 1010, and an image segmentation unit 1012. The segmentation unit 1012 may have an initial segmentation and border band unit 1014, a contour identification unit 1015, a dynamic weight unit 1016, and a border refinement unit 1018 with a force determination unit 1034, a validation unit 1036, and a shift unit 1038. At least the dynamic weight unit 1016 and border refinement unit 1018 cooperatively form an active contour unit. The operation of the system may proceed as follows.

Process 900 may include "obtain initial segmentation mask and border band location(s)" 902, and as described above with processes 300 and 400. This operation may preliminarily include the selection of the area to be segmented in the first place. Particularly, as explained above, a user may manually place a boundary around an area in an image that is to be segmented or around a foreground to be separated form a background. Otherwise, the boundary may be inserted on the image automatically, or even omitted when the entire image is to be segmented.

An initial (or general or rough or course) segmentation may be performed by many known methods some of which are already described above. One method performs the initial segmentation by using depth data rather than color data. These systems may use plane detection algorithms (mentioned above) to determine whether any of the pixels in the image form a plane. Each plane may be considered a component to be segmented. The result is a binary segmentation map or mask with 0s and 1s at each pixel location differentiating adjacent segments (such as background and foreground). The location of border bands (or unknown regions) that divide two segments may or may not be determined as a preliminary operation rather than part of the validation process since the border areas may be automatically detected by the find contour algorithms anyway as explained herein.

Process 900 may include "obtain image data" 904. This may preliminarily include obtaining the raw image data that has already been pre-processed sufficiently for segmentation and may provide pixel color and luminance values and/or other data such as gradients, histograms, and so forth. This also may include image data analyzed to provide a depth map when available. It will be understood that when the images are frames in a video sequence, any of the processes mentioned herein may apply to each image. It will be appreciated that obtaining image data here refers to obtaining the image data for the whole image for segmentation refinement at the unknown regions but could be considered to be performed before the rough segmentation.

By one option, process 900 may include "detect contour location and type" 906, and as described above, the locations of the contours are determined to provide the points forming the turns or other structure on the contours to the active contour algorithm, but the type of contour also may be provided when the active contour algorithm will apply different forces, or different applications of the same force, to contour points depending on the type of contour. As mentioned above, a find contour function may be used, such as that provided by openCV, to determine if a contour, or more accurately the component upon which the contour is the border, is a main contour, a secondary contour, or a hole, as these are described above.

Process 900 may include "select forces and force application for contours" 908, and also as described above, at least a diffusion force may be used for main or secondary contours but not for holes. Also, a balloon force may be applied differently depending on whether a hole is first to be enlarged to ensure recognition of the hole by the active contour algorithm, or the hole is to be shrunken or eliminated, or the balloon force is applied weakly for a main contour, or to expand to merge a segment with a secondary contour with another segment.

Process 900 may include "compute weights" 910. As also described above, once the combination of forces and the application of the forces for a contour is set, the dynamic weights may be calculated to adjust the forces. This may include an internal energy or force such as smoothness that limits the curvature of the contour. A weight also may be provided for an external energy or force that at least includes an edge or gradient force but could also include a line force and/or a termination force. A region force is provide to determine segmentation of pixels based on color of pixel regions for example, and a balloon force that either shrinks or enlarges segments (or objects or components) on the image. A weight for a diffusion force, a user-based constraint force and others also may be provided. The weights may be predetermined as mentioned above.

Process 900 may include "determine active contour forces including GMM based region force" 912. Thus, whichever force is computed separately from the weight that will be applied to the force is now computed, and for each force selected to be applied to a contour, and in a manner of application selected depending on the type of contour when that feature is performed.

Accordingly, process 900 then may include "apply weights to determine weighted force sum" 914, and as described above, the weights are multiplied by their corresponding force (or otherwise modify their corresponding force) to compute a weighted force. The weighted forces are then summed to form a single sum that indicates a single distance and direction to shift a contour point. This is repeated for each point on the contour that is being analyzed, and is repeated from contour to contour where each contour may have different forces applied, or the same forces applied differently, depending on the type of contour as mentioned above. The result is an initial shift in direction and distance for each or individual points of the contour. The result is then provided 918 to a validation unit that obtains the shifted point location 920.

Process 900 then may include "determine whether point is within border band" 922, and also as explained above, by using a tri-map of the image with segments and unknown bands or regions between the segment, it can be determined whether the new location for a point is within the unknown region as set by the rough segmentation. Thereafter, the process 900 includes "shift point depending on point location" 924 so that if the new location is within the unknown region, the point is moved to the new location. When the new location, however, is not within the unknown region, the point is not moved.

The process 900 then may include the query "more iterations?" 926, and if so, the process includes merging and creating points as already explained above for re-sampling the points 927, and then loops to operation 906 to detect contour locations and types, and start the next iteration. This includes changing the dynamic weights for individual or each iteration, and for each or individual forces that may be applied to a contour. By one form, the dynamic weight change depending on the detected contour type, such as changing the sign of the balloon weight as mentioned above. In addition to changing dynamic weights for individual iterations to factor the change in contour type, the weights also may be modified over time to emphasize or de-emphasize certain forces. For example, and as explained above, the smoothness force may be emphasized at first, during early iterations with a high weight value to allow more bending of a contour, but de-emphasized more toward the end of the iterations with a lower weight value when maintaining minute changes in the contour is more likely to be a priority than permitting the contour to bend. Other reasons for modifying the dynamic weights over time.

When the last iteration is reached, process 900 may include "provide refined segmentation mask" 928. Thus, the final segmentation provided in lists of contour points may be converted to a binary segmentation mask by openCV draw contour for example, and the final segmentation mask with unknown regions provided with an accurate segmentation (such as background and foreground segmentation by one example) may be provided for use by other applications as mentioned herein.

In addition, any one or more of the operations of FIGS. 3, 4A-4B, and 9 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or fixed function firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or fixed function firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 10:
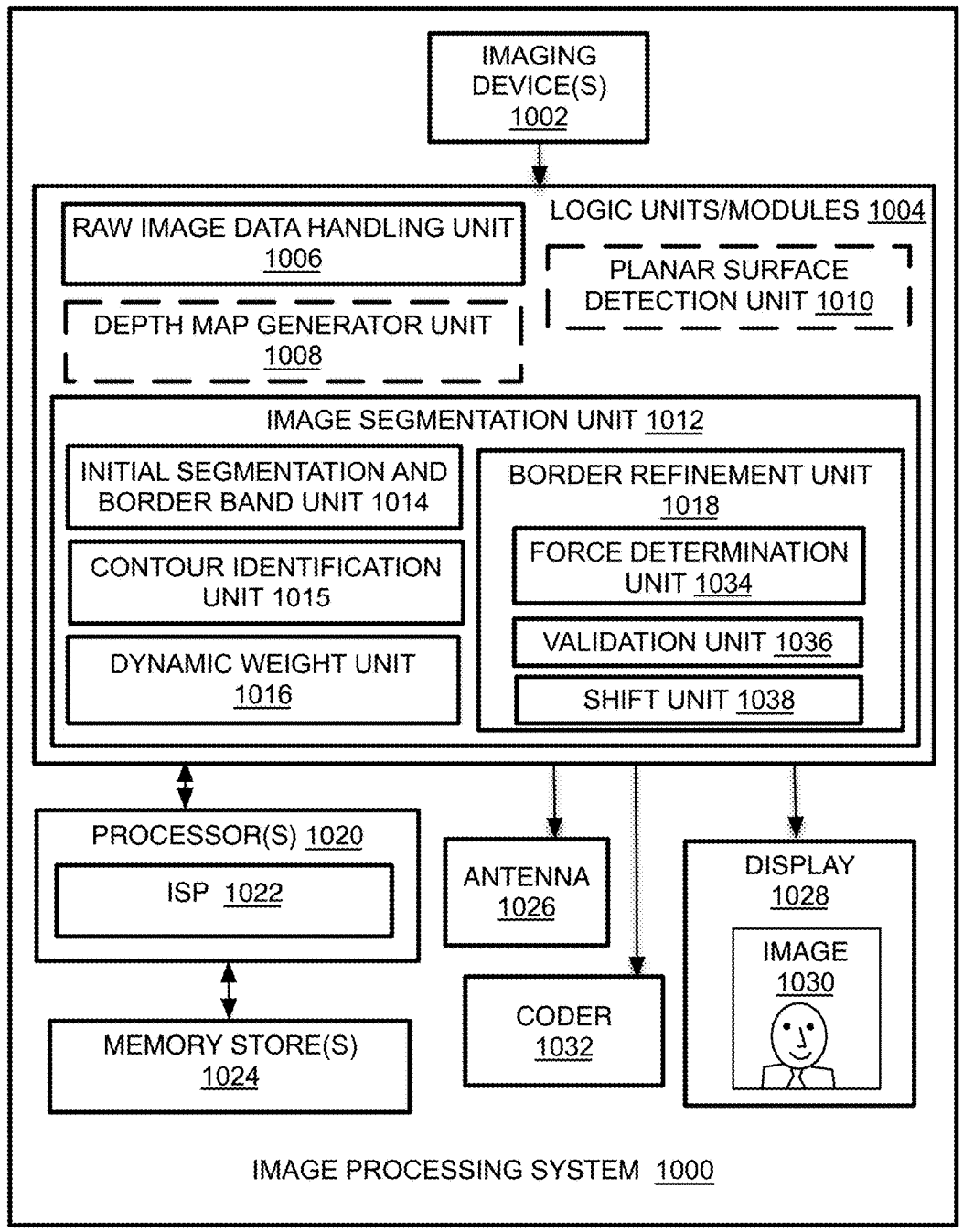
FIG. 10 is an illustrative diagram of an example system.

Referring to FIG. 10, an example image processing system 1000 is arranged in accordance with at least some implementations of the present disclosure. In various implementations, the example image processing system 1000 may have an imaging device 1002 to form or receive captured image data. This can be implemented in various ways. Thus, in one form, the image processing system 1000 may be one or more digital cameras or other image capture devices, and imaging device 1002, in this case, may be the camera hardware and camera sensor software, module, or component. In other examples, imaging processing system 1000 may have an imaging device 1002 that includes or may be one or more cameras, and logic modules 1004 may communicate remotely with, or otherwise may be communicatively coupled to, the imaging device 1002 for further processing of the image data.

Thus, image processing system 1000 may be a single camera alone or on a multi-camera device either of which may be a smartphone, tablet, laptop, or other mobile device. Otherwise, system 1000 may be the tablet or other device with multiple cameras where the processing occurs at one of the cameras or at a separate processing location communicating with the cameras whether on-board or off of the tablet or other device, and whether the processing is performed at a mobile device or not.

In any of these cases, such technology may include a camera such as a digital camera system, a dedicated camera device, or an imaging phone or tablet, whether a still picture or video camera, camera that provides a preview screen, or some combination of these. Thus, in one form, imaging device 1002 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 1002 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor also may support other types of electronic shutters, such as global shutter in addition to, or instead of, rolling shutter, and many other shutter types. In other examples, an RGB-Depth camera and/or microphone-array might be used in the alternative to a camera sensor. In some examples, imaging device 1002 may be provided with an eye tracking camera.

In the illustrated example and relevant here, the logic modules 1004 may include a raw image handling unit 1006 that performs pre-processing on the image data sufficient for segmentation but also may be sufficient for generating a depth map or depth image, a depth map generation unit 1008 that performs depth algorithms typically on multiple images of the same scene, and to form a three dimensional space where the pixels or points have three dimensional (x, y, z) coordinates on a resulting depth map or depth image that represents the three dimensional space (or 2D image or set of images of the same scene). The logic modules 1004 also may include a planar surface detection unit 1010 to detect the planar surfaces in the depth image so that the planes can be used as components in the segmentation.

The logic modules also may have an image segmentation unit 1012 to perform many of the operations already described herein. Thus, for example, the segmentation unit 1012 may have an initial segmentation unit 1014 to establish a rough segmentation resulting in a segmentation map or mask, and a contour identification unit 1015 to identify the location and type of contours at unknown regions between segments on the segmented image, and which may use an openCV find contour function or other similar algorithms. A dynamic weight unit 1016 provides the weight computations for or of an active contour algorithm, and is arranged to be performed at individual iterations of the active contour algorithm to modify the weights. A border refinement unit 1018 uses the active contour algorithm (or a similar algorithm) to refine the segmentation at the unknown regions and uses a force determination unit 1034 to compute the forces (when done so separately from computing the weights), a validation unit 1036 to check whether new positions for contour points are still remain in the unknown regions on the image, and a shift unit 1038 that actually shifts the contour points to new positions. At least the dynamic weight unit 1016 and border refinement unit 1018 may cooperatively form an active contour unit.

The image processing system 1000 may have one or more processors 1020 which may include a dedicated image signal processor (ISP) 1022 such as the Intel Atom, memory stores 1024, one or more displays 1028 to provide images 1030, a coder 1032, and antenna 1026. In one example implementation, the image processing system 1000 may have the display 1028, at least one processor 1020 communicatively coupled to the display, and at least one memory 1024 communicatively coupled to the processor. The coder 1032 may be an encoder, decoder, or both. As an encoder 1032, and with antenna 1034, the encoder may be provided to compress image data for transmission to other devices that may display or store the image. It will be understood that as a decoder, the coder may receive and decode image data for processing by the system 1000 to receive images for segmentation in addition to, or instead of, initially capturing the images with the device 1000. Otherwise, the processed image 1030 may be displayed on display 1028 or stored in memory 1024. As illustrated, any of these components may be capable of communication with one another and/or communication with portions of logic modules 1004 and/or imaging device 1002. Thus, processors 1020 may be communicatively coupled to both the image device 1002 and the logic modules 1004 for operating those components. By one approach, although image processing system 1000, as shown in FIG. 10, may include one particular set of blocks or actions associated with particular components or modules, these blocks or actions may be associated with different components or modules than the particular component or module illustrated here.

Figure 11:
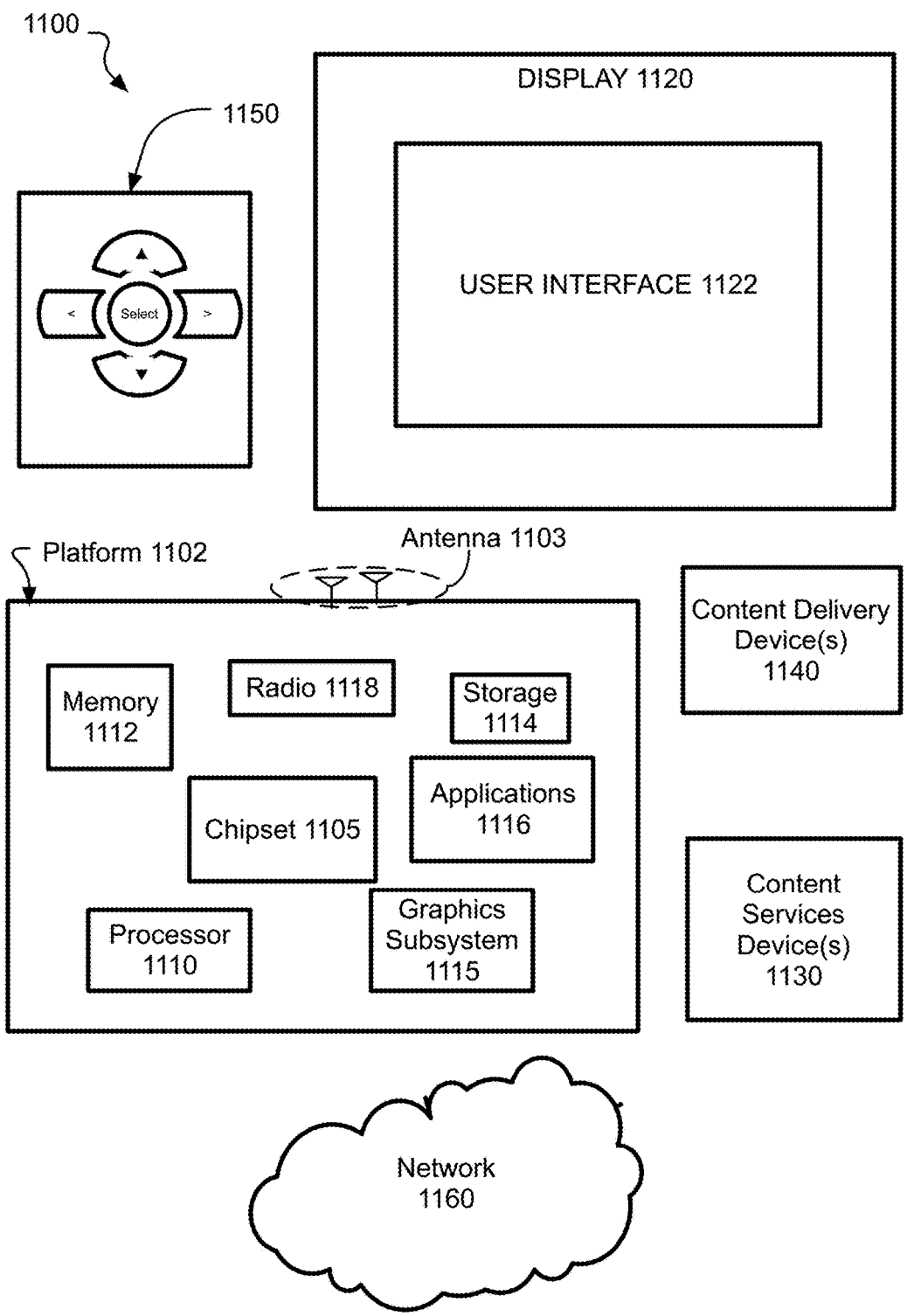
FIG. 11 is an illustrative diagram of another example system.

Referring to FIG. 11, an example system 1100 in accordance with the present disclosure operates one or more aspects of the image processing system described herein. It will be understood from the nature of the system components described below that such components may be associated with, or used to operate, certain part or parts of the image processing system 1000 described above, and therefore, used to operate the methods described herein. In various implementations, system 1100 may be a media system although system 1100 is not limited to this context. For example, system 1100 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In implementations, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In implementations, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implementations, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various implementations, system 1100 may be implemented as a wireless system, a wired system, or a combination of both. When implemented as a wireless system, system 1100 may include components and interfaces suitable for communicating over a wireless shared media, such as one or more antennas 1103, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, text ("texting") message, social media formats, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 11.

Figure 12:
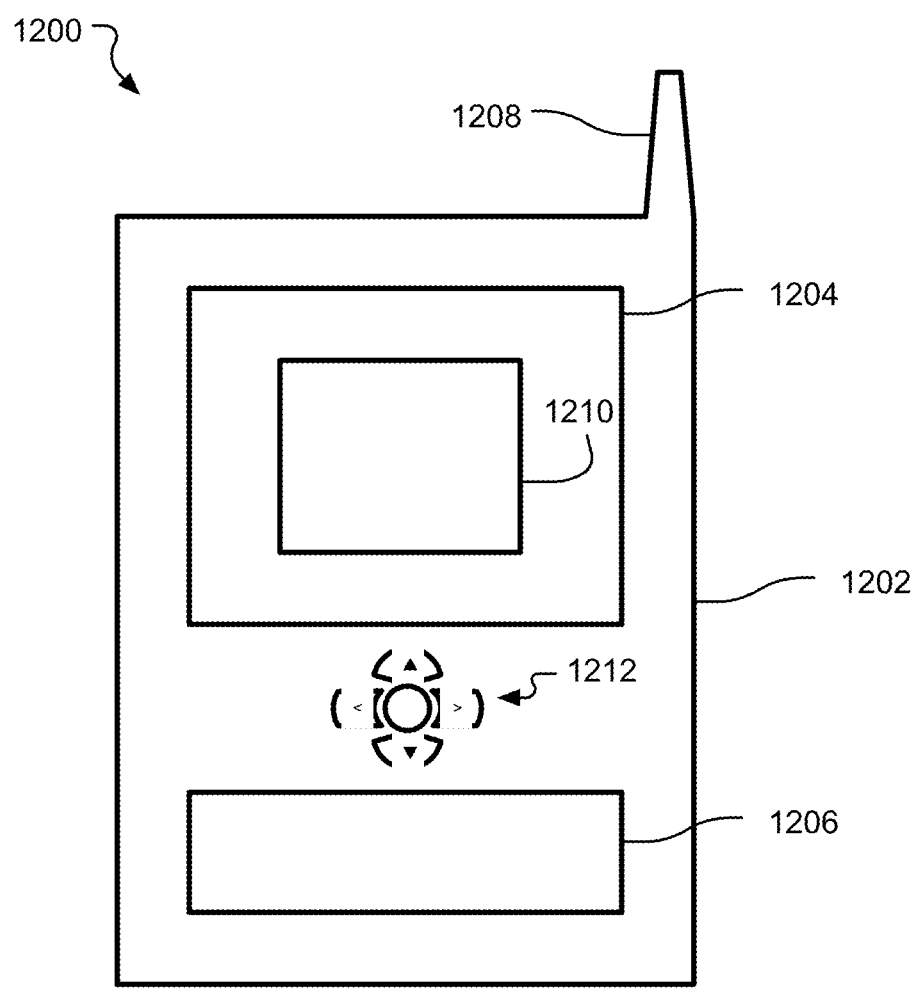
FIG. 12 illustrates another example device, all arranged in accordance with at least some implementations of the present disclosure.

Referring to FIG. 12, a small form factor device 1200 is one example of the varying physical styles or form factors in which system 1000 and/or 1100 may be embodied. By this approach, device 1200 may be implemented as a mobile computing device having wireless capabilities and multiple cameras. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet with or without multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 12, device 1200 may include a housing 1202, a display 1204 including a screen 1210, an input/output (I/O) device 1206, and an antenna 1208. Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, fixed function firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of image segmentation refinement for image processing comprises obtaining pixel data of at least one image; determining a border area cooperatively formed between at least two initially formed image area segments on the image; and determining a location shift to apply to one or more points forming at least one contour in the border area and that separates the segments comprising using an iterative active contour-type algorithm having a plurality of weighted forces applied to the points to modify the position of the points wherein one or more dynamic weights change while performing iterations to adjust a value of at least one weighted force of at least one individual iteration.

By another implementation, this method may comprise modifying at least one dynamic weight over a plurality of the iterations to weaken or strengthen at least one weighted force over the plurality of iterations; changing a smoothness dynamic weight iteration to iteration to permit less bending of the contour over time; changing a balloon dynamic weight of individual iterations by changing the sign of the weight; determining at least one characteristic of contours at at least one border area on the image, and depending on the at least one characteristic, determining at least one of: (1) which one or more of the forces to apply to a contour by the active contour-type algorithm, (2) which way to apply at least one weighted force to a contour by the active contour-type algorithm, or (3) both.

The method also includes wherein the characteristics include a position on the image between desired segments, a border area between areas of the image that should be merged into the same segment, and a border of a hole area substantially entirely enclosed within a segment and that has incorrect image data; wherein a diffusion force is applied or not applied to the contour depending on which characteristic the contour has; wherein determining which way to apply at least one force comprises determining whether to apply a weighted ballooning force to shrink or grow an object on the image; wherein determining which way to apply at least one force comprises determining which initial segments of the image are used to form a Gaussian mixture model and depending on the characteristic of the contour; re-sampling points to re-define contours at multiple individual iterations, wherein the points indicated by the results of the re-sampling are used to form the weighted forces of the individual iterations; and wherein one of the forces is a region force that is partially based on at least one Gaussian mixture model (GMM) to determine segmentation assignment of the point(s).

The method also may comprise forming at least one GMM based on multiple clusters, each cluster representing a characteristic of pixel data of pixels in a segment; wherein each cluster is based on a different color or luminance in the segment, wherein each cluster is based on the most used colors in the segment; determining a GMM for each segment cooperatively forming a border area; using the GMMs to each provide a probability that a point should be within a segment of the GMM by comparing a color of the point to colors of the segment, wherein the color of the point is interpolated from color values of a group of pixels near the point; using the multiple probabilities to adjust an initial region weight value to form the region force; using a difference between two probabilities of the GMMs to adjust the initial region weight; validating that a point should be moved to a new location indicated by the location shift comprising determining whether the new location is in the border area; and shifting the point to the new location indicated by the iterations when the new location is within the border area.

By a further implementation, a computer-implemented system of image segmentation refinement for image processing comprises at least one display; at least one memory; at least one processor communicatively coupled to the display and the memory; and an image segmentation unit operated by the processor and to: obtain pixel data of at least one image; determine a border area cooperatively formed between at least two initially formed image area segments on the image; and determine a location shift to apply to one or more points forming at least one contour in the border area and that separates the segments comprising using an iterative active contour-type algorithm having a plurality of weighted forces applied to the points to modify the position of the points wherein one or more dynamic weights change while performing iterations to adjust a value of at least one weighted force of at least one individual iteration.

The system also may include the image segmentation unit to modify at least one dynamic weight over a plurality of the iterations to weaken or strengthen at least one weighted force over the plurality of iterations; change a smoothness dynamic weight iteration to iteration to permit less bending of the contour over time; change a balloon dynamic weight of individual iterations by changing the sign of the weight; determining at least one characteristic of contours at at least one border area on the image, and depending on the at least one characteristic, determine at least one of: (1) which one or more of the forces to apply to a contour by the active contour-type algorithm, (2) which way to apply at least one weighted force to a contour by the active contour-type algorithm, or (3) both.

The segmentation unit of the system also may include wherein the characteristics include a position on the image between desired segments, a border area between areas of the image that should be merged into the same segment, and a border of a hole area substantially entirely enclosed within a segment and that has incorrect image data; wherein a diffusion force is applied or not applied to the contour depending on which characteristic the contour has; wherein determining which way to apply at least one force comprises determining whether to apply a weighted ballooning force to shrink or grow an object on the image; wherein determining which way to apply at least one force comprises determining which initial segments of the image are used to form a Gaussian mixture model and depending on the characteristic of the contour; re-sample points to re-define contours at multiple individual iterations, wherein the points indicated by the results of the re-sampling are used to form the weighted forces of the individual iterations; and wherein one of the forces is a region force that is partially based on at least one Gaussian mixture model (GMM) to determine segmentation assignment of the point(s).

The segmentation unit of the system also may form at least one GMM based on multiple clusters, each cluster representing a characteristic of pixel data of pixels in a segment; wherein each cluster is based on a different color or luminance in the segment, wherein each cluster is based on the most used colors in the segment; determine a GMM for each segment cooperatively forming a border area; use the GMMs to each provide a probability that a point should be within a segment of the GMM by comparing a color of the point to colors of the segment, wherein the color of the point is interpolated from color values of a group of pixels near the point; use the multiple probabilities to adjust an initial region weight value to form the region force; use a difference between two probabilities of the GMMs to adjust the initial region weight; validate that a point should be moved to a new location indicated by the location shift comprising determining whether the new location is in the border area; and shift the point to the new location indicated by the iterations when the new location is within the border area.

The system may also include that wherein the at least one border area comprises a main border area as a thin band of about 10 pixels wide extending around at least a portion of the border between two desired segments.

As another implementation, a computer-readable medium having stored thereon instructions that when executed cause a computing device to: the instructions execute the computing device to: obtain pixel data of at least one image; determine a border area cooperatively formed between at least two initially formed image area segments on the image; and determine a location shift to apply to one or more points forming at least one contour in the border area and that separates the segments comprising using an iterative active contour-type algorithm having a plurality of weighted forces applied to the points to modify the position of the points wherein one or more dynamic weights change while performing iterations to adjust a value of at least one weighted force of at least one individual iteration.

The instructions also may cause the computing device to modify at least one dynamic weight over a plurality of the iterations to weaken or strengthen at least one weighted force over the plurality of iterations; change a smoothness dynamic weight iteration to iteration to permit less bending of the contour over time; change a balloon dynamic weight of individual iterations by changing the sign of the weight; determining at least one characteristic of contours at at least one border area on the image, and depending on the at least one characteristic, determine at least one of: (1) which one or more of the forces to apply to a contour by the active contour-type algorithm, (2) which way to apply at least one weighted force to a contour by the active contour-type algorithm, or (3) both.

The instructions also may include wherein the characteristics include a position on the image between desired segments, a border area between areas of the image that should be merged into the same segment, and a border of a hole area substantially entirely enclosed within a segment and that has incorrect image data; wherein a diffusion force is applied or not applied to the contour depending on which characteristic the contour has; wherein determining which way to apply at least one force comprises determining whether to apply a weighted ballooning force to shrink or grow an object on the image; wherein determining which way to apply at least one force comprises determining which initial segments of the image are used to form a Gaussian mixture model and depending on the characteristic of the contour; re-sample points to re-define contours at multiple individual iterations, wherein the points indicated by the results of the re-sampling are used to form the weighted forces of the individual iterations; and wherein one of the forces is a region force that is partially based on at least one Gaussian mixture model (GMM) to determine segmentation assignment of the point(s).

The instructions also may cause the computing device to form at least one GMM based on multiple clusters, each cluster representing a characteristic of pixel data of pixels in a segment; wherein each cluster is based on a different color or luminance in the segment, wherein each cluster is based on the most used colors in the segment; determine a GMM for each segment cooperatively forming a border area; use the GMMs to each provide a probability that a point should be within a segment of the GMM by comparing a color of the point to colors of the segment, wherein the color of the point is interpolated from color values of a group of pixels near the point; use the multiple probabilities to adjust an initial region weight value to form the region force; use a difference between two probabilities of the GMMs to adjust the initial region weight; validate that a point should be moved to a new location indicated by the location shift comprising determining whether the new location is in the border area; and shift the point to the new location indicated by the iterations when the new location is within the border area.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of image segmentation refinement for image processing, comprising:
   obtaining pixel data of at least one image;
   determining a border area cooperatively formed between at least two initially formed image area segments on the image; and
   determining a location shift to apply to one or more points forming at least one contour in the border area and that separates the segments comprising using an iterative active contour-type algorithm having a plurality of weighted forces each of a different treatment that generates the force in a different way and applied to the points to modify the position of the points wherein one or more dynamic weights change while performing iterations to adjust a value of at least one weighted force of at least one individual iteration.

2. The method of claim 1 comprising modifying at least one dynamic weight over a plurality of the iterations to weaken or strengthen at least one weighted force over the plurality of iterations.

3. The method of claim 2 comprising changing a smoothness dynamic weight iteration to iteration to permit less bending of the contour over time.

4. The method of claim 1 comprising changing a balloon dynamic weight of individual iterations by changing the sign of the weight.

5. The method of claim 1 comprising determining at least one characteristic of contours that is a general arrangement of the contour at at least one border area on the image, and depending on the at least one characteristic, determining at least one of:
   which one or more of the forces to apply to a contour by the active contour-type algorithm,
   which way to apply at least one weighted force to a contour by the active contour-type algorithm, or
   both.

6. The method of claim 5 wherein the characteristics include a position on the image between desired segments, a border area between areas of the image that should be merged into the same segment, and a border of a hole area substantially entirely enclosed within a segment and that has incorrect image data.

7. The method of claim 6 wherein a diffusion force is applied or not applied to the contour depending on which characteristic the contour has.

8. The method of claim 6 wherein determining which way to apply at least one force comprises determining whether to apply a weighted ballooning force to shrink or grow an object on the image.

9. The method of claim 5 wherein determining which way to apply at least one force comprises determining which initial segments of the image are used to form a Gaussian mixture model and depending on the characteristic of the contour.

10. The method of claim 5 comprising re-sampling points to re-define contours at multiple individual iterations, wherein the points indicated by the results of the re-sampling are used to form the weighted forces of the individual iterations.

11. The method of claim 1 wherein one of the forces is a region force that is partially based on at least one Gaussian mixture model (GMM) to determine segmentation assignment of the point(s).

12. The method of claim 11 comprising forming at least one GMM based on multiple clusters, each cluster representing a characteristic of pixel data of pixels in a segment.

13. The method of claim 11 comprising determining a GMM for each segment cooperatively forming a border area.

14. The method of claim 13 comprising using the GMMs to each provide a probability that a point should be within a segment of the GMM by comparing a color of the point to colors of the segment.

15. The method of claim 14 wherein the color of the point is interpolated from color values of a group of pixels near the point.

16. The method of claim 14 comprising using the multiple probabilities to adjust an initial region weight value to form the region force.

17. The method of claim 16 comprising using a difference between two probabilities of the GMMs to adjust the initial region weight.

18. The method of claim 1 comprising validating that a point should be moved to a new location indicated by the location shift comprising determining whether the new location is in the border area.

19. The method of claim 18 comprising shifting the point to the new location indicated by the iterations when the new location is within the border area.

20. The method of claim 12 comprising at least one of:
   wherein each cluster is based on a different color or luminance in the segment; and
   wherein each cluster is based on the most used colors in the segment.

21. A computer-implemented system of image segmentation refinement for image processing, comprising:
   at least one display;
   at least one memory
   at least one processor communicatively coupled to the display and the memory; and
   an image segmentation unit operated by the at least one processor and to:
      obtain pixel data of at least one image;
      determine a border area cooperatively formed between at least two initially formed image area segments on the image; and
      determine a location shift to apply to one or more points forming at least one contour in the border area and that separates the segments comprising using an iterative active contour-type algorithm having a plurality of weighted forces each of a different treatment that generates the force in a different way and applied to the points to modify the position of the points wherein one or more dynamic weights change while performing iterations to adjust a value of at least one weighted force of at least one individual iteration.

22. The system of claim 21 wherein the image segmentation unit is to:
- modify at least one dynamic weight over a plurality of the iterations to weaken or strengthen at least one weighted force over the plurality of iterations;
- change a smoothness dynamic weight iteration to iteration to permit less bending of the contour over time;
- change a balloon dynamic weight of individual iterations by changing the sign of the weight;
- determine at least one characteristic of contours at at least one border area on the image, and depending on the at least one characteristic, determining at least one of:
  - which one or more of the forces to apply to a contour by the active contour-type algorithm,
  - which way to apply at least one weighted force to a contour by the active contour-type algorithm, or
  - both;
  - wherein the characteristics include a position on the image between desired segments, a border area between areas of the image that should be merged into the same segment, and a border of a hole area substantially entirely enclosed within a segment and that has incorrect image data;
  - wherein a diffusion force is applied or not applied to the contour depending on which characteristic the contour has;
  - wherein determining which way to apply at least one force comprises determining whether to apply a weighted ballooning force to shrink or grow an object on the image;
  - wherein determining which way to apply at least one force comprises determining which initial segments of the image are used to form a Gaussian mixture model and depending on the characteristic of the contour;
- re-sample points to re-define contours at multiple individual iterations, wherein the points indicated by the results of the re-sampling are used to form the weighted forces of the individual iterations;
- wherein one of the forces is a region force that is partially based on at least one Gaussian mixture model (GMM) to determine segmentation assignment of the point(s).

23. A non-transitory computer-readable medium having stored thereon instructions that when executed cause a computing device to:
- obtain pixel data of at least one image;
- determine a border area cooperatively formed between at least two initially formed image area segments on the image; and
- determine a location shift to apply to one or more points forming at least one contour in the border area and that separates the segments comprising using an iterative active contour-type algorithm having a plurality of weighted forces each of a different treatment that generates the force in a different way and applied to the points to modify the position of the points wherein one or more dynamic weights change while performing iterations to adjust a value of at least one weighted force of at least one individual iteration.

24. The method of claim 1 wherein the treatments comprise at least two of:
- an internal smoothing force that limits curvature of the contour comprising pushing points toward an average position between previous and succeeding points along the contour,
- an external gradient force that bends the contour toward other content structure on the image comprising pushing points toward color gradients,
- a region force that indicates whether a pixel should be at the border and uses a Gaussian mixture model,
- a balloon force that expands and contracts holes, and
- a diffusion force that reduces sensitivity of the contour to noise.

25. The method of claim 24 wherein at least four of the treatments are provided with each treatment having an adjustable one of the weights to adjust the strength of a force of a treatment relative to the strength of the forces of the other treatments.

* * * * *